United States Patent
Garg et al.

(10) Patent No.: US 10,033,520 B2
(45) Date of Patent: *Jul. 24, 2018

(54) MULTILANE SERDES CLOCK AND DATA SKEW ALIGNMENT FOR MULTI-STANDARD SUPPORT

(71) Applicant: Avago Technologies General IP (Singapore) Pte. Ltd., Singapore (SG)

(72) Inventors: Adesh Garg, Aliso Viejo, CA (US); Jun Cao, Irvine, CA (US); Namik Kocaman, San Clemente, CA (US); Kuo-J (Nick) Huang, Irvine, CA (US); Delong Cui, Tustin, CA (US); Afshin Momtaz, Laguna Hills, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,127

(22) Filed: Jun. 30, 2015

(65) Prior Publication Data

US 2015/0304098 A1 Oct. 22, 2015

Related U.S. Application Data

(63) Continuation of application No. 13/691,482, filed on Nov. 30, 2012, now Pat. No. 9,100,167.

(51) Int. Cl.
G06F 1/26 (2006.01)
H04L 7/00 (2006.01)
(Continued)

(52) U.S. Cl.
CPC .............. *H04L 7/0025* (2013.01); *G06F 1/10* (2013.01); *H04L 7/033* (2013.01); *H04L 25/14* (2013.01); *G06F 1/3203* (2013.01)

(58) Field of Classification Search
CPC .................................. G06F 1/10; H04L 7/0025
(Continued)

(56) References Cited

U.S. PATENT DOCUMENTS 7,023,257 B1 * 4/2006 Sullam ...................... G06F 1/12
327/144
7,131,024 B1 * 10/2006 Venkata ................... G06F 1/06
713/500

(Continued)

OTHER PUBLICATIONS

U.S. Appl. No. 13/691,482, filed Nov. 30, 2012, Adesh Garg et al.

*Primary Examiner* — Jaweed A Abbaszadeh
*Assistant Examiner* — Volvick Derose
(74) *Attorney, Agent, or Firm* — Sterne, Kessler, Goldstein & Fox P.L.L.C.

(57) ABSTRACT

A communication system may include a number of communication channels operating in accordance with one or more communication standards. The channels may generate data clocks from one or more master clock signals. The phase of the data clocks may be aligned using phase detectors for determining respective phase relationships and using phase interpolators for adjusting respective clock phases. The communication system may include communication channels that operate at different data clock frequencies. These systems may divide their respective data clocks in order to achieve a common clock frequency for use in their phase alignment. The phase detectors and associated circuitry may be disabled to save power when not in use.

20 Claims, 6 Drawing Sheets

(51) Int. Cl.
*H04L 7/033* (2006.01)
*G06F 1/10* (2006.01)
*H04L 25/14* (2006.01)
*G06F 1/32* (2006.01)

(58) Field of Classification Search
USPC .................................................. 713/503
See application file for complete search history.

(56) References Cited

U.S. PATENT DOCUMENTS

| | | | | |
|---|---|---|---|---|
| 2002/0055334 A1* | 5/2002 | Simmons | ................ | H04L 1/245 455/67.11 |
| 2002/0106043 A1* | 8/2002 | Sasaki | ................... | H04L 7/0029 375/355 |
| 2002/0191723 A1* | 12/2002 | Fujita | ........................ | H03L 7/06 375/371 |
| 2003/0053565 A1* | 3/2003 | Yang | ......................... | H03L 7/07 375/327 |
| 2003/0174798 A1* | 9/2003 | Pickering | ................ | H04L 25/14 375/376 |
| 2004/0135602 A1* | 7/2004 | Ward | .................... | H04L 7/0008 327/141 |
| 2005/0286669 A1* | 12/2005 | Buchwald | ............... | H04L 25/20 375/356 |
| 2006/0029160 A1* | 2/2006 | Kim | ....................... | H03L 7/0814 375/326 |
| 2006/0050827 A1* | 3/2006 | Saeki | ................... | H03M 9/00 375/362 |
| 2006/0133466 A1* | 6/2006 | Palmer | ................... | H03L 7/0812 375/215 |
| 2006/0133816 A1* | 6/2006 | Shin | ...................... | H04L 7/0075 398/154 |
| 2006/0221759 A1* | 10/2006 | Smith | ...................... | G11C 7/22 365/189.03 |
| 2007/0046349 A1* | 3/2007 | Fujisawa | ................... | H03L 7/00 327/163 |
| 2007/0092039 A1 | 4/2007 | Yang et al. | | |
| 2008/0080600 A1* | 4/2008 | Dai | ........................ | H03K 5/135 375/220 |
| 2008/0266002 A1* | 10/2008 | Liu | ...................... | H03K 23/667 331/25 |
| 2009/0125747 A1* | 5/2009 | Morein | ..................... | H04L 7/02 713/400 |
| 2009/0147896 A1* | 6/2009 | Frankel | ............... | H04L 27/2071 375/354 |
| 2009/0245449 A1* | 10/2009 | Umai | ..................... | H03K 5/156 375/376 |
| 2009/0290649 A1* | 11/2009 | Cheung | ................... | H04L 25/12 375/257 |
| 2010/0158180 A1* | 6/2010 | Ribo | ..................... | H04L 7/0337 375/371 |
| 2010/0283525 A1* | 11/2010 | Yoshikawa | .............. | H03K 3/84 327/237 |
| 2011/0074483 A1* | 3/2011 | Wang | .................... | H03L 7/0807 327/306 |
| 2011/0080822 A1* | 4/2011 | Kikugawa | ........ | G11B 20/10009 369/121 |
| 2012/0189045 A1* | 7/2012 | Abbasfar | ................... | H03L 7/07 375/229 |
| 2014/0153680 A1 | 6/2014 | Garg et al. | | |
| 2015/0236618 A1* | 8/2015 | Perdikakis | ................ | H02P 6/14 318/400.27 |

* cited by examiner ic # MULTILANE SERDES CLOCK AND DATA SKEW ALIGNMENT FOR MULTI-STANDARD SUPPORT

CROSS-REFERENCE TO RELATED APPLICATIONS

This application claims priority to U.S. patent application Ser. No. 13/691,482, entitled "Multilane Serdes Clock and Data Skew Alignment for Multi-Standard Support" and filed on Nov. 30, 2012, now allowed, the entirety of which is incorporated by reference herein.

BACKGROUND

Technical Field

The present invention relates to communication systems, and in particular, to multi-lane serializer/deserializer (SERDES) clock and data skew alignment for multi-standard support in communication circuits.

Background Art

Communication systems for transmitting data may operate according to a number of standards and implementations. One such implementation is a SERDES communication channel that takes a given number of data bits from a digital domain, serializes the data, and transmits the data to a receiver that deserializes it for another digital domain. SERDES data transmission implementations can be used in a wide range of communication systems and devices, such as mobile devices, desktop computers and servers, computer networks, and telecommunication networks.

Communication systems may include multiple channels or lanes (e.g., multilane transceivers, etc.) for transmitting data, and this introduces difficulties in aligning data and clock signals across the multiple channels. For example, clock circuitry for different channels may start up in different states and cause a skew of the data from lane to lane. This skew should be removed for synchronous operation, as the skew from lane to lane can be as large as the lowest clock period. For high speed SERDES implementations, the output data rate relative to the low speed clock may cause the multi-channel skew to increase further. Previous solutions have relied on complex reset circuits to bring multiple channels up in the same state. However, reliability coming out of reset depends on careful, complex distribution of reset signals and relative timing to running clocks. Another complication exists in the difficulties of resetting high-speed clock dividers (referred to herein as "dividers") as stringent timing margins and resettable high speed dividers require significant power and circuit area consumption. Additionally, asynchronous reset architectures have unacceptably high probabilities of failure.

Another concern for communication systems using SERDES with multiple channels is that multiplexors (MUX) used in the SERDES circuitry may have different architectures and timing characteristics. For example, two different MUX architectures may have different timing delays in propagating data. This leads to variations in timing across the channels and further exaggerates clock and data skew in the system even when data is transmitted from the digital domain at the same time.

The implementation of different communication standards in a system also complicates alignment in multichannel designs. Design dependency between multiple design cores and/or architectures also raises clock and data alignment difficulties. The previous solutions noted above cannot easily be added or modified, and this problem is further exacerbated by the inclusion of additional architectures and standards.

BRIEF SUMMARY

Methods, systems, and apparatuses are described for aligning multiple data and clock signals in communication circuits for the same, or different, communication standards, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

Figure 1:
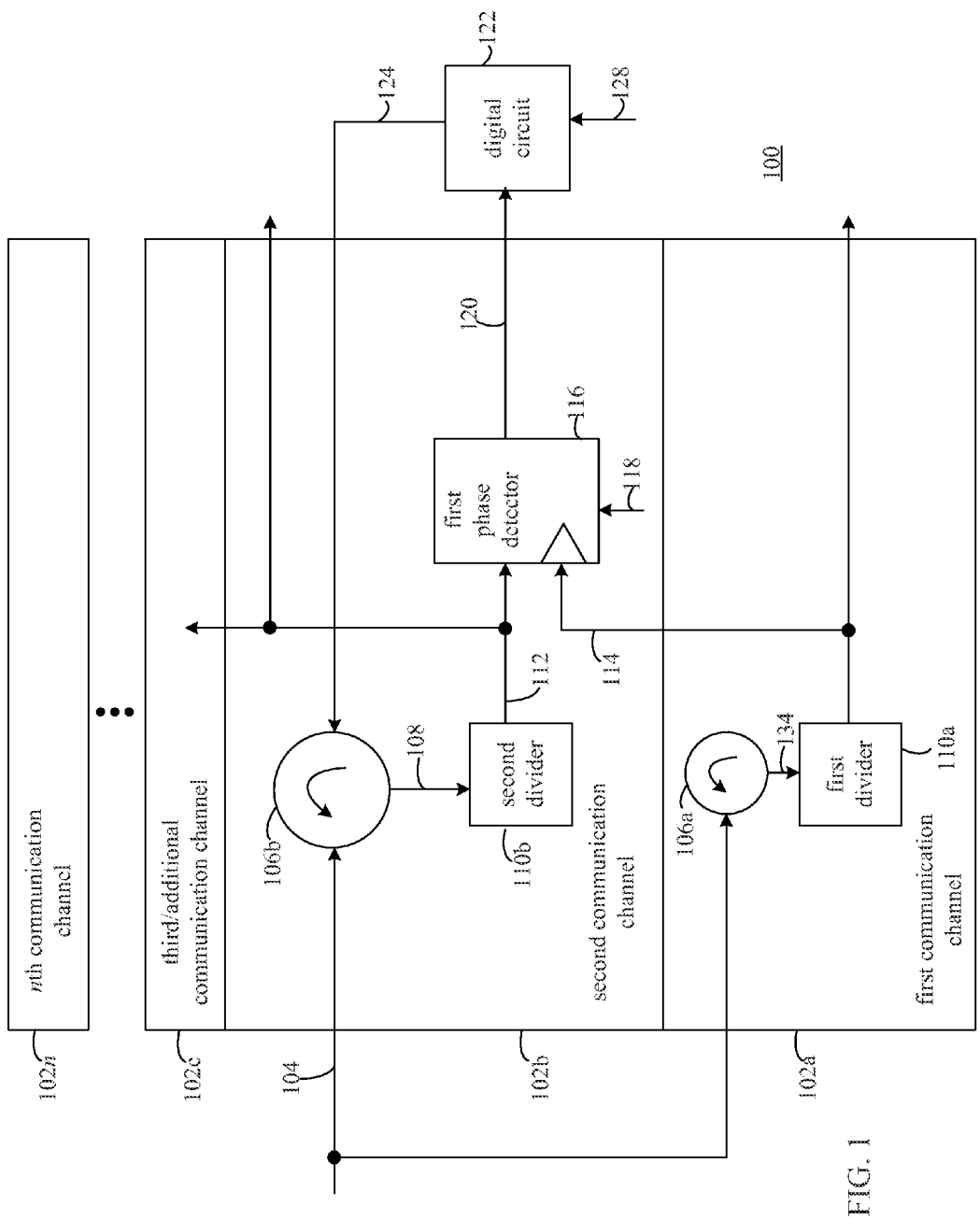
FIG. 1 shows a block diagram of a portion of a communication system configured to align clocks of multiple communication channels, according to an exemplary embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

Example Embodiments

The example embodiments described herein are provided for illustrative purposes, and are not limiting. The examples described herein may be adapted to various types of mobile communications systems, including cellular networks, wireless local area network(s), digital radio systems, etc. Furthermore, additional structural and operational embodiments, including modifications/alterations, will become apparent to persons skilled in the relevant art(s) from the teachings herein.

In embodiments, communication systems with multiple communication channels and/or multiple clock domains may be aligned with respect to their clock and data signals to remove skew. For example, multiple communication channels having clock dividers may be initiated on startup or from reset in different states. The different states of the clock dividers may cause clock and data phase misalignment between two or more communication channels. In an embodiment, a phase detector may determine a phase difference between two communication channels. A phase interpolator may adjust a communication channel clock, and a divided clock generated by its clock divider, with respect to another communication channel clock based on an indication of the phase difference.

The multiple communication channels may have clocks with different frequencies, may have data interfaces of different widths (e.g., data word bit lengths), and may operate according to different communication protocols and standards. Aligning communication channel clock and data phases may ensure coherent data transfers in communication systems with multiple, synchronous channels. Further, in vertically and/or horizontally polarized optical communication systems, as well as systems with higher data communication rates, maintaining aligned communication channels benefits system reliability and function.

Portable, design-efficient embodiments, such as those described herein, allow for alignment and synchronization of clocks and data across multiple communication channels, multiple clock domains, and multiple communication standards. Various example embodiments are described in the following subsections. For instance, example communication systems are described, followed by a description of daisy chain and master-slave configurations for aligning communication channel clock phases using phase detectors. This is followed by descriptions of embodiments for using a single phase detector for aligning larger numbers of communication channels, and embodiments for aligning clock phases in systems having different communication channel architectures. Subsequently, various example operational embodiments for aligning clock phases in communications systems are described.

Example Communication System Embodiments

Communication systems may include various types of devices that include transmitters and receivers to communicate data between each other. Embodiments described herein may be included in receivers and transmitters in such devices. For instance, embodiments may be included in mobile devices (laptop computers, handheld devices such as mobile phones (e.g., cellular and smart phones), handheld computers, handheld music players, and further types of mobile devices), desktop computers and servers, computer networks, and telecommunication networks.

Embodiments can be incorporated into various types of communication systems, such as intra-computer data transmission structures (e.g., Peripheral Component Interconnect (PCI) Express bus), telecommunication networks, traditional and wireless local area networks (LANs and WLANs), wired and wireless point-to-point connections, optical data transmission systems (e.g., short haul, long haul, etc.), high-speed data transmission systems, coherent optical systems and/or other types of communication systems using SERDES. For example, transferring data across a computer network (wired or wireless) may be accomplished using a variety of communication standards in which data from the transmitting device is serialized and transferred serially over an appropriate medium (e.g., Ethernet cables, fiber optic cables, etc.) or wirelessly to a receiving device that deserializes the data. Transmission media and wireless connections also allow for transfer of data using different types of communication protocols within a given medium or wireless connection. The data transmission market is steadily increasing as the computing and communications industries evolve and grow, and as data/content sharing continues to rise globally.

Increasing data transfer speeds in communications systems with SERDES provides design challenges due to clock and data misalignments. Avoiding these misalignments causes circuit design difficulties. SERDES circuitry may use dividers in order to serially transmit data from a bus, and the dividers may come up out of reset in different states causing clock phase misalignments that translate into data misalignments. High speed data transfers increase the possibility of misaligns as the alignment margins grow smaller with faster clock frequencies. Misalignments can cause data channels to provide data too early or too late with respect to each other. Such misalignments can adversely impact synchronous designs.

Embodiments presented herein overcome problems with clock and data alignment in communication systems with SERDES for data transfer. Example embodiments are described in detail in the following section.

For instance, methods, systems, and apparatuses are provided for aligning multiple data and clock signals in communication circuits for the same, or different, communication standards. In an example aspect, a communication system is provided. The communication system includes a first communication channel and a first phase detector. The first communication channel includes a phase interpolator configured to receive a master clock signal and generate a first phase adjusted clock signal, and a first divider configured to generate a first divided clock signal from the first phase adjusted clock signal, the first divided clock signal configured to clock a first data stream through the first communication channel. The first phase detector is configured to determine a phase difference between the first divided clock signal and a second divided clock signal of a second communication channel. The phase interpolator is also configured to adjust a phase of the first phase adjusted clock signal based on the determined phase difference.

In a further example aspect, a communication system is provided. The communication system includes a first communication channel and a phase detector. The first communication channel includes a first phase interpolator configured to receive a first master clock signal and generate a first phase adjusted clock signal. The first communication channel also includes a first divider configured to divide the first phase adjusted clock signal by a first factor to generate a first divided clock signal, the first divided clock signal configured to clock a first data stream through the first communication channel, and a second divider configured to divide the first divided clock signal to generate a second divided clock signal. The phase detector is configured to determine a phase difference between the second divided clock signal and a third divided clock signal of a second communication channel. A phase of the first phase adjusted clock signal is adjusted by the first phase interpolator based on the determined phase difference.

In yet another example aspect, a method in a communication system is provided. The method includes generating a phase adjusted clock signal for a first communication channel based on a master clock signal, and generating a first divided clock signal based on the phase adjusted clock signal. The method also includes determining a phase difference between the first divided clock signal and a second divided clock signal of a second communication channel, and adjusting a phase of the phase adjusted clock signal based on the determined phase difference.

Example Daisy Chain and Master-Slave Alignment Embodiments

Communication systems may be configured in various ways to have their communication channels phase aligned, in embodiments. For example, FIG. 1 shows a block diagram of a communication system 100, according to an embodiment. Communication system 100 may be any communication system such as, but not limited to, an intra-computer data transmission system (e.g., Peripheral Component Interconnect (PCI) Express bus), a telecommunication network, a traditional and/or wireless local area network (LANs and WLANs), a wired and wireless point-to-point connection, an optical data transmission system, a high-speed data transmission systems, a coherent optical system and/or another type of communication system with SERDES. Communication system 100 may be implemented in hardware, or a combination of hardware and software and/or firmware. As shown in FIG. 1, communication system 100 may include a number of communication channels 102a-n. For instance, in some embodiments, communication system 100 may include two of communication channels 102a-n (e.g., a first communication channel 102a and a second communication channel 102b), and in some embodiments, communication system 100 may include three of communication channels 102a-n (e.g., first communication channel 102a, second communication channel 102b, and a third/additional communication channel 102c). In some embodiments, up to n of communication channels 102a-n may be used to transfer data, where n may be any integer value greater than 3. It is contemplated that in the embodiments described herein, communication channels (e.g., 102a-n) may be identically configured to allow modular implementation. Some or all of communication channels 102a-n may be synchronous or asynchronous with respect to each other, and communication channels 102a-n may transfer data using the same or different data transfer protocols. Communication system 100 may include functionality further than shown in FIG. 1, as would be known to persons skilled in relevant art(s). However, such additional functionality is not shown in FIG. 1 for purposes of brevity. The elements of communication system 100 are described as follows.

As shown in FIG. 1, first communication channel 102a includes a first divider 110a and a first phase interpolator 106a; second communication channel 102b includes a second phase interpolator 106b, a second divider 110b, a first phase detector 116, and a digital circuit 122. Second phase interpolator 106b, second divider 110b, first phase detector 116, and digital circuit 122 may be referred to as calibration logic, which is used to calibrate a clock signal for second communication channel 102b. Each subsequent communication channel (e.g., third communication channel 102c, etc.) may include calibration logic similar to second communication channel 102b to calibrate a corresponding clock signal. Furthermore, although not shown in FIG. 1, first communication channel 102a may include a phase detector similar to first phase detector 116, and the phase detector may not be used (furthermore, in an embodiment, first phase interpolator 106a may not be used). Such an embodiment enhances a modularity of system 100, where any number of identically configured communication channels may be present.

Figure 2:
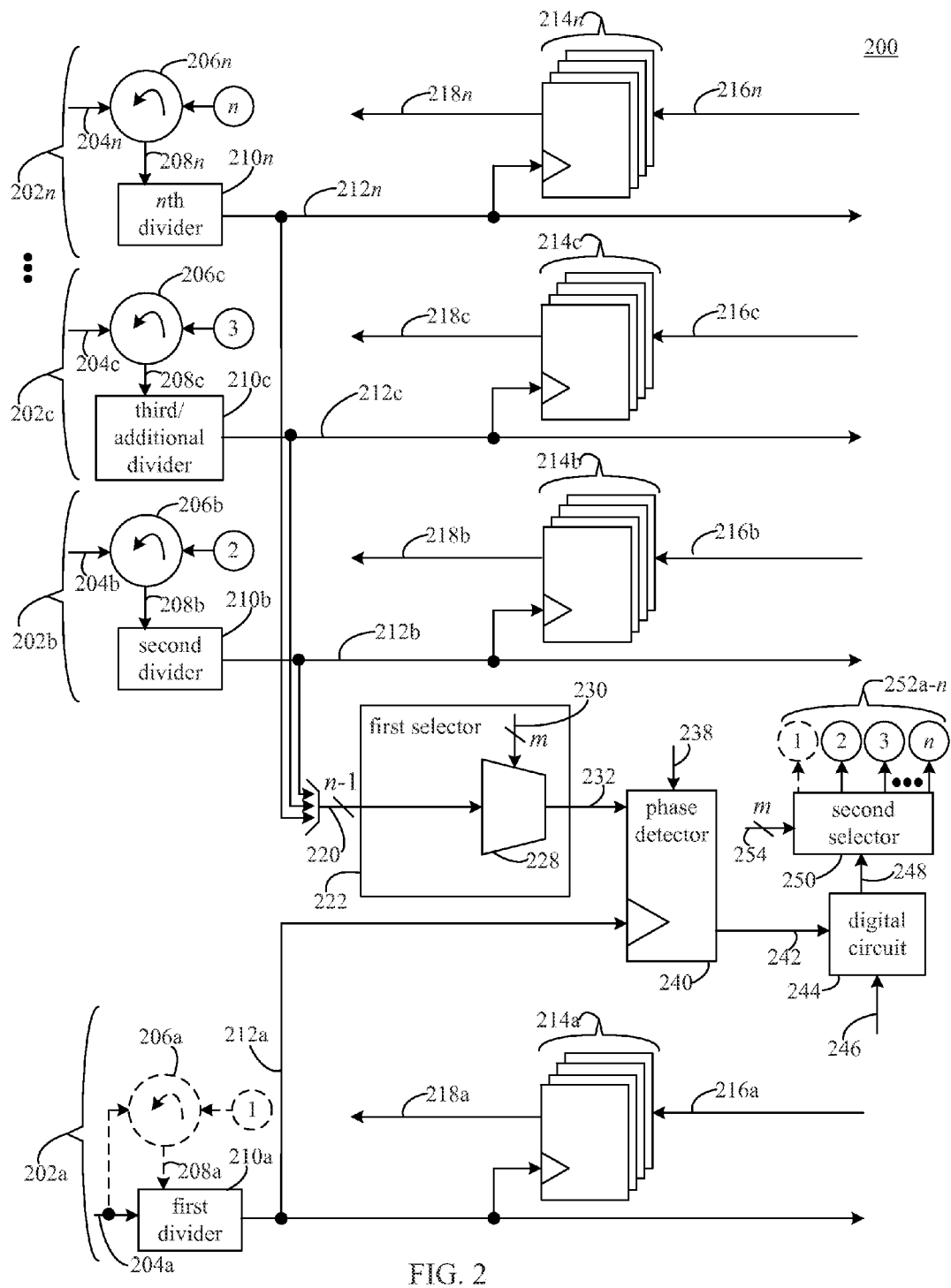
FIG. 2 shows a block diagram of a portion of a communication system configured to align clocks of multiple communication channels, according to another exemplary embodiment.

First communication channel 102a may include functionality to enable the transfer of a data stream through first communication channel 102a. First communication channel 102a may receive a master clock signal 104. Master clock signal 104 may be generated by a phase lock loop (PLL) (not shown) or any other type of clock generator. In some embodiments, when more than one clock generator is used to generate clock signals in the communication systems described herein for communication lanes, the clock generators used may be locked with respect to each other (e.g., the clock generators have the same frequency). First phase interpolator 106a may receive master clock signal 104 as an input and may output a phase-adjusted master clock signal as a phase adjusted clock signal 134. In some embodiments, phase adjusted clock signal 134 may have no (zero) phase adjustment. It is also contemplated that in some embodiments, first phase interpolator 106a may be omitted and master clock signal 104 may be transmitted directly to first divider 110a. First divider 110a may receive phase adjusted clock signal 134 as an input and may output a first divided clock signal 114. First divided clock signal 114 may be generated by dividing a frequency master clock signal 104 to match the incoming data rate of data on a given channel (e.g., data on one or more data lines 216a-216n, as shown in FIG. 2 and discussed below) or by another number. First divided clock signal 114 may be used as the clock for transferring data through first communication channel 102a (e.g., first divided clock signal 114 may be provided as a clock signal to one or more sets of registers used to stored data transmitting through first communication channel 102a). First divided clock signal 114 may also be provided to second communication channel 102b, as discussed further below.

Second communication channel 102b may include functionality to enable the transfer of a data stream through second communication channel 102b that is aligned with communication channel 102a. Second communication channel 102b may receive master clock signal 104. Second phase interpolator 106b may include functionality to enable a phase adjustment of received master clock signal 104. Second phase interpolator 106b may receive master clock signal 104 and a phase adjustment signal 124 as inputs and may output a phase-adjusted master clock signal as a first phase adjusted clock signal 108. For instance, second phase interpolator 106b may shift (delay) the phase of master clock signal 104 by an amount indicated by phase adjustment signal 124 to generate first phase adjusted clock signal 108. Second divider 110b may receive first phase adjusted clock signal 108 as an input and may output a second divided clock signal 112. Second divided clock signal 112 may be generated by dividing a frequency of first phase adjusted clock to match the incoming data rate of data on a given channel (e.g., data on one or more data lines 216a-216n, as shown in FIG. 2 and discussed below). Second divided clock signal 112 may be used as the clock for transferring data through second communication channel 102b (e.g., second divided clock signal 112 may be provided as a clock signal to one or more sets of registers used to stored data transmitting through second communication channel 102b). Second divided clock signal 112 may also be provided to third/additional communication channel 102c.

First phase detector 116 may include functionality for enabling the detection of a leading or lagging phase between two clock signals. In some embodiments, first phase detector 116 may be a flip-flop (e.g., a D flip-flop), while in other embodiments first phase detector 116 may be a latch, a register, or the like. First phase detector 116 may receive first divided clock signal 114 and second divided clock signal 112 as inputs. In some embodiments, for example, when first phase detector 116 is a D flip-flop, first divided clock signal 114 may be input as the clock for first phase detector 116 (e.g., received at a clock port of the D flip-flop), and second divided clock signal 112 may be input as the data for first phase detector 116 (e.g., received at a data port of the D flip-flop). First phase detector 116 may output a phase difference signal 120 indicating a difference in phase between first divided clock signal 114 and second divided clock signal 112 (e.g., at the D output port when first phase detector 116 is a D flip-flop). For example, in the case where the phase of second divided clock signal 112 leads the phase of first divided clock signal 114, phase difference signal 120 may be represented as a '1' (one) or a logic "high" signal. In the case where the phase of second divided clock signal 112 lags the phase of first divided clock signal 114, phase difference signal 120 may be represented as a '0' (zero) or a logic "low" signal. It is contemplated that in various embodiments, according to design considerations, phase difference signal 120 maybe a '1' for a lagging phase and a '0' for a leading phase. First phase detector 116 may provide phase difference signal 120 to a digital circuit 122.

First phase detector 116 may, in some embodiments, be enabled and/or disabled by a disable signal 118. First phase detector 116 may be enabled/disabled by disable signal 118 in response to completing a phase adjustment of first phase adjusted clock signal 108 (e.g., after a predetermined amount of time or number of clock cycles, etc.). Disable signal 118 may be generated by hardware, or a combination of hardware and software and/or firmware within or without communication system 100. Disable signal 118 and any associated generating logic/circuitry may include functionality further than shown in FIG. 1, as would be known to persons skilled in relevant art(s). However, such additional functionality is not shown in FIG. 1 for purposes of brevity. By disabling first phase detector 116 upon completion of the phase adjustment of first phase adjusted clock signal 108 (i.e., when first phase detector 116 is not actively in use), power savings and noise reduction may be achieved. First phase detector 116 may be enabled by disable signal 118 at the start up of communication system 100 or second communication channel 102b, or when coming out of a reset state of communication system 100 or second communication channel 102b. As such, calibration for the clock phases of one or more communication channels (e.g., 102a-102n) in a communication system (e.g., 100) may be performed at start up or when coming out of reset, and the phase detector(s) may be disabled after the calibration is performed. In some embodiments, calibration may be performed during data communication on one or more communication channels (e.g., 102a-102n).

It is contemplated that, in some embodiments, first phase detector 116 may reside, physically or logically, in second communication channel 102b. In other embodiments, first phase detector 116 may reside outside of second communication channel 102b but inside communication system 100. In still further embodiments, first phase detector 116 may reside outside of communication system 100.

In some embodiments, communication system 100 may also include digital circuit 122, as shown in FIG. 1. Digital circuit 122 may include functionality for enabling detection of a phase difference that is outside of an acceptable tolerance. For example, an amount of phase difference between first divided clock signal 114 and second divided clock signal 112 may be detected. In some embodiments, digital circuit 122 may be a digital filter. Digital circuit 122 may receive phase difference signal 120 as an input, and may output phase adjustment signal 124 to second phase interpolator 106b. For instance, digital circuit 122 may detect that phase difference signal 120 includes a long string of "1" s or a long string of "0" s that indicates a significant phase difference between divided clock signals 114 and 112, and may therefore generate phase adjustment signal 124 to cause second phase interpolator 106b to adjust the phase of master clock signal 104 accordingly in first phase adjusted clock signal 108. Digital circuit 122 may filter out a frequent switching between "1" s and "0" s (relatively short duration strings of "1" s and "0" s) in phase difference signal 120 as indicating that a phase difference between divided clock signals 114 and 112 is in an acceptable range. Digital circuit 122 may, in some embodiments, be enabled and/or disabled by a digital disable signal 128. Digital circuit 122 may be enabled/disabled by digital disable signal 128 in response to completing a phase adjustment of first phase adjusted clock signal 108. Digital disable signal 128 may be the same signal as disable signal 118 or may be generated separately, but similarly, to disable signal 118, as described above.

Third/Additional communication channel 102c through nth communication channel 102n may each be similarly, or identically, configured to second communication channel 102b. However, the details of these channels are not shown in FIG. 1 for purposes brevity and clarity. For example, second divided clock signal 112 may be provided to a second phase detector (not shown) in third/additional communication channel 102c, and a phase difference between a third divided clock signal (not shown) in third/additional communication channel 102c and second divided clock signal 112 may be determined by a second phase detector (not shown). This phase difference may be provided to a phase interpolator to adjust the phase of master clock signal 104 to generate a phase adjusted master clock signal for third/additional communication channel 102c. This modular approach may allow for flexibility in aligning communication channel 102a-n phases. It is also contemplated that any, or each, of third/additional communication channel 102c through nth communication channel 102n may have a corresponding, or shared, digital circuit (not shown) that is similarly, or identically, configured to digital circuit 122.

Such a communication system configuration, where the divided clock signal of the previous communication channel is provided to the next communication channel to be compared to the divided clock signal of the next communication channel (to generate a phase difference signal used to adjust the phase of the master clock signal at that next communication channel) is referred to as a "daisy chain" configuration. As mentioned above, this approach enables a series of similarly (or identically) configured communication channels to be used in a modular fashion.

It is also contemplated that, in some embodiments, each communication channel phase difference may be determined between a given communication channel's divided clock (e.g., third divided clock (not shown)) and first divided clock 114. For instance, rather than providing second divided clock 112 to third/additional channel 102c to determine a phase difference between third divided clock (not shown) and second divided clock 112, first divided clock 114 may be provided to third/additional channel 102c to determine a phase difference between third divided clock (not shown) and first divided clock 114. Such an approach may allow for a lower margin of error in clock and data alignment as each communication channel 102b-n may be adjusted with respect to a single divided clock signal (e.g., first divided clock 114). That is, the likelihood of propagating a "carry-over" margin of error is reduced by using a single divided clock signal as an alignment reference, rather than providing the divided clock signal of the previous communication channel to the next communication channel for phase comparison, as in the daisy chain configuration approach.

This communication system configuration, wherein the same divided clock signal (of a first communication channel) is provided to each of a plurality of next communication channels for comparison to each of the divided clock signals of those next communication channels (to generate a phase difference signal at each communication channel used to adjust the phase of the master clock signal locally) is referred to as a "master-slave" configuration. This approach also enables a series of similarly (or identically) configured communication channels to be used in a modular fashion subsequent to the first communication channel.

It is further contemplated that the phase adjustment described with respect to communication system 100 of FIG. 1 may be performed at a transmitter side or a receiver side of communication system 100, as would be apparent to persons skilled in relevant art(s) having the benefit of this disclosure.

Communication channels 102a-n, first phase detector 116, and digital circuit 122 may be coupled together in alternative manners to enable clock and data phase alignment between communication channels 102a-n. For instance, in the following example communication system, a single phase detector is used to phase align clocks for a plurality of communication channels.

Example Shared Phase Detector Embodiments

In the embodiments described above, each communication channel included a corresponding phase detector used to enable phase alignment for that channel. In further embodiments, two or more communication channels may share a common phase detector to perform phase alignment for those channels Such an implementation may use less circuitry than when each communication channel includes its own phase detector (e.g., as described above with respect to FIG. 1).

For example, FIG. 2 shows a communication system 200, according to an example embodiment. Communication system 200 may be any communication system such as those described herein, and communication system 200 may be implemented in hardware, or a combination of hardware and software and/or firmware. Communication system 200 may include a number of communication channels 202a-n, as shown in FIG. 2. In some embodiments, communication system 200 may include two of communication channels 202a-n (e.g., a first communication channel 202a and a second communication channel 202b), and in some embodiments, communication system 200 may include three of communication channels 202a-n (e.g., first communication channel 202a, second communication channel 202b, and a third/additional communication channel 202c). In some embodiments, up to n of communication channels 202a-n may be used to transfer data, where n may be any integer value greater than 3. Communication channels 202a-n may be synchronous or asynchronous with respect to each other. For example, two or more communication channels may transmit data according to one or more phase-aligned clocks in some embodiments, while in other embodiments one or more communication channels may transfer data independently of other channels. Further, communication channels 202a-n may transfer data using the same or different data transfer protocols. Communication system 200 may include functionality further than shown in FIG. 2, as would be known to persons skilled in relevant art(s). However, such additional functionality is not shown in FIG. 2 for purposes of brevity. The elements of communication system 200 are described as follows.

First communication channel 202a may include functionality to enable the transfer of a data stream through first communication channel 202a. First communication channel 202a may receive a first master clock signal 204a. First master clock signal 204a may be generated by a phase lock loop (PLL) (not shown) or any other type of clock generator. In some embodiments, when more than one clock generator is used to generate clock signals in communication system 200, the clock generators used are locked with respect to each other (e.g., the clock generators have the same frequency). First communication channel 202a may include a first divider 210a. First divider 210a may receive first master clock signal 204a as an input and may output a first divided clock signal 212a. First divided clock signal 212a may be generated by dividing (a frequency of) first master clock signal 204a by the number of data bits in the interface of first communication channel 202a (i.e., the number of data bits to be transferred through first communication channel 202a, or a bit width of first communication channel 202a). First communication channel 202a may optionally, according to some embodiments, include an additional phase interpolator 206a configured to generate and output an additional phase adjusted clock signal 208a based upon first master clock signal 204a. In such an alternative embodiment, first divider 210a may receive additional phase adjusted clock signal 208a as an input and generate first divided clock signal 212a based upon additional phase adjusted clock signal 208a, rather than upon first master clock signal 204a.

First divided clock signal 212a may be used as the clock for transferring data through first communication channel 202a. First divided clock signal 212a may also be provided to a first selector 222, as discussed further below.

First communication channel 202a may also include a number of first data driving circuits 214a. In some embodiments, first data driving circuits 214a may be composed of flip-flops (e.g., D flip-flops), latches, registers and/or the like, which act as data drivers. The number of data drivers in first data driving circuits 214a may be greater than or equal to the number of data bits in the data interface of first communication channel 202a (e.g. a bit width of first communication channel 202a). That is, there may be at least one individual data driver of first data driving circuits 214a for each bit of data of the data interface of first communication channel 202a (i.e., at least one individual data driver of first data driving circuits 214a for each bit of data transferred through first communication channel 202a in one clock cycle). Each of the data drivers of first data driving circuits 214a may receive first divided clock signal 212a as a clock input and data on a first data line 216a as data input(s), and then drive (i.e., transfer) data through first communication channel 202a on a first transfer data line 218a. It is noted that first data line 216a and first transfer data line 218a may be any number of data bits (i.e., have a data width) according to design-specific requirements.

Second communication channel 202b may include functionality to enable the transfer of a data stream through second communication channel 202b. Second communication channel 202b may receive a second master clock signal 204b. Second master clock signal 204b may be generated by a phase lock loop (PLL) (not shown) or any other type of clock generator. The PLL may be the same PLL discussed above with respect to first communication channel 202a or may be a different clock generator as described above. In some embodiments, second master clock signal 204b may be the same signal as first master clock signal 204a. Second communication channel 202b may include a first phase interpolator 206b configured to generate and output an second phase adjusted clock signal 208b based upon second master clock signal 204b. Second communication channel 202b may include a second divider 210b. Second divider 210b may receive second phase adjusted signal 208b as an input and may output a second divided clock signal 212b. Second divided clock signal 212b may be generated by dividing second phase adjusted signal 208b by the number of data bits in the interface of second communication channel 202b (i.e., the number of data bits to be transferred through second communication channel 202b in one clock cycle).

Second divided clock signal 212b may be used as the clock for transferring data through second communication channel 202b. Second divided clock signal 212b may also be provided to first selector 222, as discussed further below.

Second communication channel 202b may also include a number of second data driving circuits 214b. In some embodiments, second data driving circuits 214b may be composed of flip-flops (e.g., D flip-flops), latches, registers and/or the like, which act as data drivers. The number of data drivers in second data driving circuits 214b may be greater than or equal to the number of data bits in the data interface of second communication channel 202b. That is, there may be at least one individual data driver of second data driving circuits 214b for each bit of data of the data interface of second communication channel 202b (i.e., at least one individual data driver of second data driving circuits 214b for each bit of data transferred through second communication channel 202b). Each of the data drivers of second data driving circuits 214b may receive second divided clock signal 212b as a clock input and data on a second data line 216b as data input(s), and then drive (i.e., transfer) data through second communication channel 202b on a second transfer data line 218b. It is noted that second data line 216b and second transfer data line 218b may be any number of data bits (i.e., have a data width) according to design-specific requirements.

Communication system 200 may also include communication channels 202c-n in accordance with some embodiments. Communication channels 202c-n may be configured similarly, or identically, to communication channel 202b, as described above. For example, communication channels 202c-n may receive a third master clock signal 204c through an nth master clock signal 204n respectively, and may include a third phase interpolator 206c through an nth phase interpolator 206n configured to generate a third phase adjusted signal 208c through an nth phase adjusted signal 206n, and a third/additional divider 210c through an nth divider 210n configured to generate a third divided clock signal 212c through an nth divided clock signal 212n, respectively. Third divided clock signal 212c through an nth divided clock signal 212n may be used as the clocks for transferring data on third communication channel 202c through nth communication channel 202n respectively, and may also each be provided to first selector 222, as discussed further below.

Third communication channel 202c through nth communication channel 202n may also each include a number of third data driving circuits 214c through nth data driving circuits 214n, respectively, similarly or identically configured as second data driving circuits 214b described above. Each of the data drivers of third data driving circuits 214c through nth data driving circuits 214n may receive their respective divided clock signals 212c-n as a clock input and data on a respective data line 216c-n as data input(s), and then drive (i.e., transfer) data through their respective communication channel 202c-n on a respective transmit data line 218c-n.

It is noted that communication channels 102a-102n of FIG. 1 may each include a corresponding one of data driving circuits 214a-214n that is used to transfer data therethrough according to the corresponding divided clock signal.

Referring back to FIG. 2, communication system 200 may also include first selector 222 and a phase detector 240. First selector 222 may include functionality to enable selection of one or more of divided clock signals 212a-n to be provided as inputs to phase detector 240. As shown in FIG. 2, according to some embodiments, such as a master-slave embodiment, first selector 222 may receive divided clock signals 212b-n, shown in FIG. 2 as a combined divided clock signal line 220 for illustrative purposes. First selector 222 may include a first multiplexor (MUX) 228. It is contemplated, in other embodiments, that first selector 222 may include alternative or additional components and/or circuitry for performing selection of one or more of divided clock signals 212b-n. First MUX 228 may receive combined divided clock signal line 220 as an input. First MUX 228 may select a received input according to a first select signal 230. First select signal 230 may be one or more bits wide, according to design, such that the number of bits of first select signal 230 is sufficient to allow selection of n−1 inputs of first MUX 228. First select signal 230 may be determined and/or configured in hardware, or a combination of hardware and software and/or firmware (not shown), as would be understood by persons skilled in relevant art(s) having the benefit of this disclosure.

In some embodiments (e.g., master-slave embodiments), first MUX 228 may provide a given one of divided clock signals 212b-n as its output on a first MUX output 232 to phase detector 240 (as a data input). According to a master-slave embodiment, first divider 210a transmits divided clock signal 212a (as a master clock) as its output to phase detector 240 (as a clock input). In a daisy chain embodiment, a given divided clock signal "x" may be output by first MUX 228, and a different divided clock signal "x−1" may be output by a second MUX (not shown). It is contemplated that the second MUX may be similarly configured as first MUX 228. That is, if second divided clock signal 212b is selected and output by first MUX 228, then first divided clock signal 212a may be selected and output by the second MUX (not shown). Similarly, if third divided clock signal 212c is selected and output by first MUX 228, then second divided clock signal 212b may be selected and output by the second MUX.

In a master-slave embodiment, a given one of divided clock signals 212a-n may be used as a reference signal for aligning each of the other divided clock signals 212a-n (not including the selected given one of the divided clock signals 221a-n). That is, the chosen master clock of divided clock signals 212a-n is transmitted as a clock input to phase detector 240 for each of the remaining divided clock signals 212a-n which are provided by first MUX 228 to phase detector 240 as data inputs. For example, as described above, first divided clock signal 212a may be selected as the master clock to be provided as a clock input to phase detector 240, while one or more of the remaining divided clock signals 212b-n (e.g., divided clock signal 212b, divided clock signals 212b-c, divided clock signals 212b-n, etc.) may be provided in turn by first MUX 228 to phase detector 240 as data inputs.

First selector 222 may select each, or any combination of, divided clock signals 212a-n to be provided to phase detector 240 as data input(s). The different divided clock signals 212a-n may be provided to phase detector 240 as data inputs in a serial fashion. For example, if second divided clock signal 212b is provided to phase detector 240 as an input first, after a phase adjustment of first phase adjusted signal 208b (which corresponds to second divided clock signal 212b) is completed, third divided clock 212c may be provided to phase detector 240 next as an input in response to the completion.

Phase detector 240 may include functionality for enabling the detection of a leading or lagging phase between two of divided clock signals 212a-n. In some embodiments, phase detector 240 may be a flip-flop (e.g., a D flip-flop), while in other embodiments phase detector 240 may be a latch, a register, or the like. Phase detector 240, as described above, may receive one or more of divided clock signals 214a-n as data input(s) and may receive different ones of divided clock signals 214a-n as clock inputs. In some embodiments, for example, when phase detector 240 is a D flip-flop, first divided clock signal 212a may be input as the clock for phase detector 240, and second divided clock signal 212b may be input as the data for phase detector 240. Phase detector 240 may output a phase difference signal 242 based on first divided clock signal 212a and second divided clock signal 212b. For example, in the case where the phase of second divided clock signal 212b leads the phase of first divided clock signal 212a, phase difference signal 242 may be represented as a '1' (one) or a logic "high" signal. In the case where the phase of second divided clock signal 212b lags the phase of first divided clock signal 212a, phase difference signal 242 may be represented as a '0' (zero) or a logic "low" signal. It is contemplated that in various embodiments, according to design considerations, phase difference signal 240 maybe a '1' for a lagging phase and a '0' for a leading phase. Phase detector 240 may provide phase difference signal 242 to a digital circuit 244.

Phase detector 240 may, in some embodiments, be enabled and/or disabled by a disable signal 238. Phase detector 240 may be enabled/disabled by disable signal 238 in response to completing a phase adjustment of one, some, or all, of phase adjusted clock signals 208a-n. Disable signal 238 may be generated by hardware, or a combination of hardware and software and/or firmware within or without communication system 200. Disable signal 238 and any associated circuitry may include functionality further than shown in FIG. 2, as would be known to persons skilled in relevant art(s). However, such additional functionality is not shown in FIG. 2 for purposes of brevity. By disabling phase detector 240 upon completion of the phase adjustments communication system 200 (i.e., when phase detector 240 is not actively in use), power savings and noise reduction may be achieved. Phase detector 240 may be enabled by disable signal 238 at the startup of communication system 200, startup of one or more of communication channels 202a-n, or when coming out of a reset state of communication system 200 or one or more of communication channels 202a-n.

It is contemplated that, in some embodiments, phase detector 240 may reside, physically or logically, in one of communication channels 202a-n. In other embodiments, phase detector 240 may reside outside of communication channels 202a-n but inside communication system 200. In still further embodiments, phase detector 240 may reside outside of communication system 200. In some embodiments with multi-channel communications, the physical connection length (e.g., "trace length") between communication system components, e.g., as described herein, may be designed in an optimized and/or matched fashion (e.g., by balanced routing of signal lines) to prevent delay and/or skew mismatches that may occur due to component locations within the communication system.

In some embodiments, communication system 200 may also include digital circuit 244, as shown in FIG. 2. Digital circuit 244 may include functionality for enabling detection of a phase difference between two signals that is outside of an acceptable tolerance (e.g., similarly to digital circuit 122 of FIG. 1). For example, an amount of phase difference between two of divided clock signals 212a-n may be detected. In some embodiments, digital circuit 244 may be a digital filter. Digital circuit 244 may receive phase difference signal 242 as an input, and may filter phase difference signal 242 to generate phase adjustment signal 248, which is received at a second selector 250. Digital circuit 244 may, in some embodiments, be enabled and/or disabled by a digital disable signal 246. Digital circuit 244 may be enabled/disabled by digital disable signal 246 in response to completing a phase adjustment of one or more of phase adjusted clock signals 208a-n. Digital disable signal 246 may be the same signal as disable signal 238 or may be generated separately, but similarly, to disable signal 238, as described above.

Second selector 250 may select and output phase adjustment signal 248 to one of phase interpolators 206a-n via interpolator adjustment inputs 252a-n respectively. It is noted that in various embodiments, interpolator adjustment input 252a connected to additional phase interpolator 206a may be optional. Second selector 250 may include a demultiplexor or other equivalent circuitry to enable the selection of one of interpolator adjustment inputs 252a-n. The output of second selector 250 may be determined by a third select signal 254. Third select signal 254 may be m-bits wide, according to design, such that m bits are sufficient to allow selection of n outputs from second selector 250. For example, m may be determined, for a given n, according to Equation 1, as described above. Third select signal 254 may be determined and/or provided by hardware, or a combination of hardware and software and/or firmware (not shown), as would be understood by persons skilled in relevant art(s) having the benefit of this disclosure.

It is also contemplated that the phase adjustment described with respect to communication system 200 of FIG. 2 may be performed at a transmitter side or a receiver side of communication system 200, as would be apparent to persons skilled in relevant art(s) having the benefit of this disclosure.

Accordingly, in some embodiments, such as is shown in FIG. 2 multiple communication channels (e.g., communication channels 202*a-n*) may be aligned using a single phase detector (e.g., phase detector 240). By enabling multi-channel alignment using a single phase detector, valuable circuit area and routing may be conserved, and phase alignment may be achieved in existing designs simply and easily.

Example Embodiments for Channels Having Different Characteristics

In the embodiments described above, multiple communication channels having similar architectures are aligned by aligning the lowest speed clocks of the channels (e.g., the divided clock signals). In embodiments, communication channels that have different characteristics may be phase aligned. For instance, in an embodiment, a communication channel may be configured to enable clock and data phase alignment between communication channels with different data transfer latencies, different architectures, and/or different operational clock frequencies.

Figure 3:
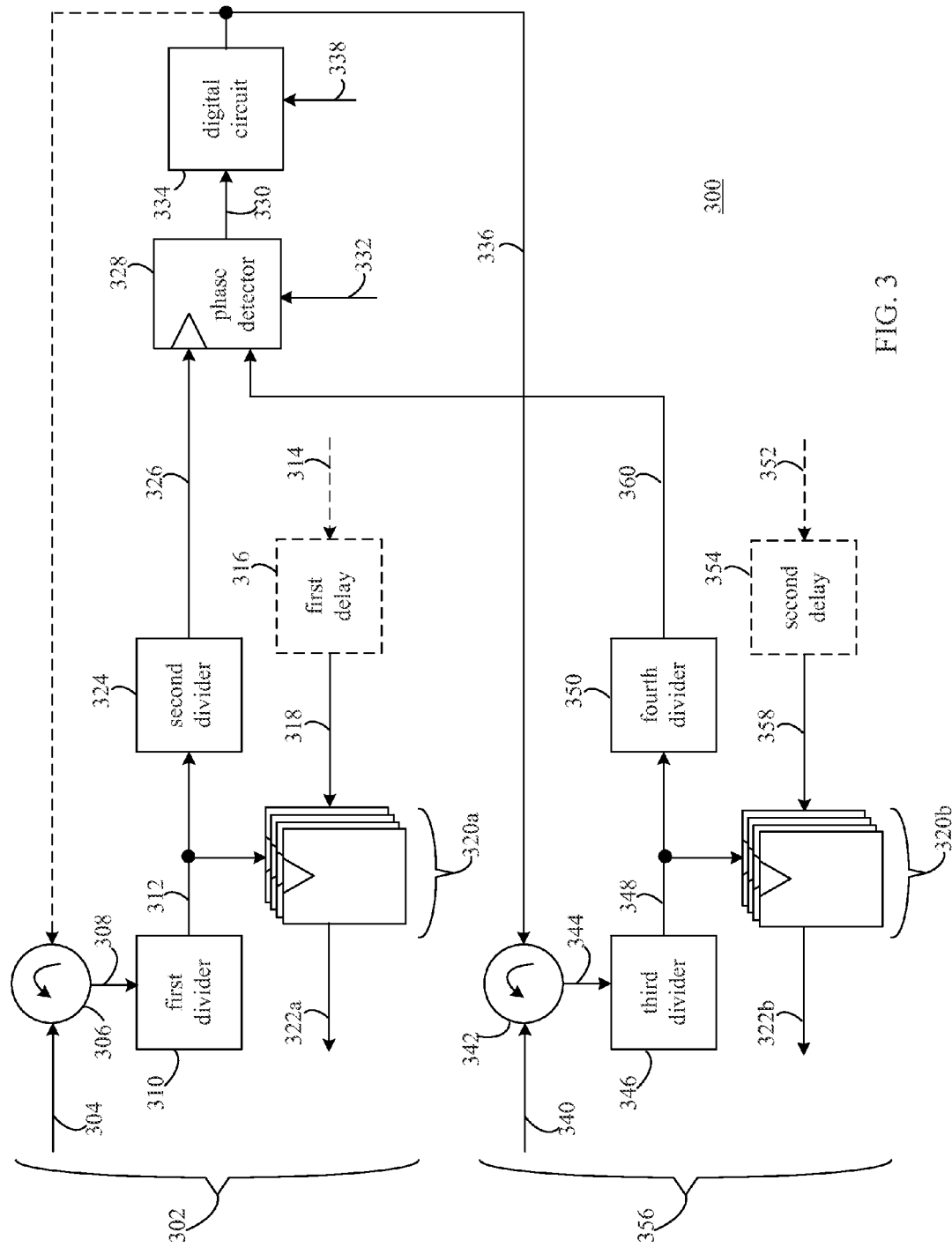
FIG. 3 shows a block diagram of a portion of a communication system configured to align clocks of communication channels that transmit data at different rates, according to a further exemplary embodiment.

For example, FIG. 3 shows a communication system 300, according to an example embodiment. Communication system 300 may be any communication system such as those described herein, and communication system 300 may be implemented in hardware, or a combination of hardware and software and/or firmware. Communication system 300 may include a number of communication channels, e.g., communication channels 302 and 356, as shown in FIG. 3. Communication channels 302 and 356 may be synchronous or asynchronous with respect to each other, and communication channels 302 and 356 may transfer data using the same or different data transfer speeds and or protocols. In some embodiments, communication channels 302 and 356 may have different data transfer latencies (e.g., due to different multiplexor architectures within communication channels 302 and 356), and in some embodiments, communication channels 302 and 356 may transfer data at different clock frequencies (e.g., first communication channel 302 may transfer data at a first clock frequency and second communication channel 356 may transfer data at a second clock frequency). Communication channels 302 and 356 may transfer data by the same or different data transfer protocols, and may transfer the same or different numbers of data bits per their respective interfaces. Communication system 300 may also include functionality further than shown in FIG. 3, as would be known to persons skilled in relevant art(s). However, such additional functionality is not shown in FIG. 3 for purposes of brevity. The elements of communication system 300 are described as follows.

First communication channel 302 may include functionality to enable the transfer of a data stream through first communication channel 302. First communication channel 302 may receive a first master clock signal 304. First master clock signal 304 may be generated by a phase lock loop (PLL) (not shown) or any other type of clock generator. In some embodiments, when more than one clock generator is used to generate clock signals in communication system 300, the clock generators used are locked with respect to each other (e.g., the clock generators have the same frequency). First communication channel 302 may include a first phase interpolator 306 configured to generate and output a first phase adjusted clock signal 308 based upon first master clock signal 304. First communication channel 302 may include a first divider 310 that may receive first phase adjusted clock signal 308 as an input and generate a first divided clock signal 312 based upon first phase adjusted clock signal 308. First divided clock signal 312 may be generated by dividing first master clock signal 304 by the number of data bits in the interface of first communication channel 302 (i.e., the number of data bits to be transferred through first communication channel 302 in a clock cycle). First divided clock signal 312 may be used as the clock for transferring data through first communication channel 302 as described below.

First communication channel 302 may also include a number of first data driving circuits 320*a*. In some embodiments, first data driving circuits 320*a* may be composed of flip-flops (e.g., D flip-flops), latches, registers and/or the like, which act as data drivers. The number of data drivers in first data driving circuits 320*a* may be greater than or equal to the number of data bits in the data interface of first communication channel 302 (e.g., a data bus width). Each of the data drivers of first data driving circuits 320*a* may receive first divided clock signal 312 as a clock input and a first data line 318 as a data input. In some embodiments, data transferred on first communication channel 302 may optionally be provided from a first optional data line 314 and through a first delay 316 before being provided to first data line 318. In such embodiments, first delay 316 may be any delay element (e.g., a buffer, an inverter or inverter pair, and/or the like) configured to delay data on first optional data line 314 such that a difference between data transmission timing due to architectural differences between communication channels 302 and 356 is reduced or eliminated. Data on first communication channel 302 may then be driven (i.e., transferred) through first communication channel 302 on a first transmit data line 322*a* by first data driving circuits 320*a*. It is noted that first data line 318, first optional data line 314, and first transmit data line 322*a* may be any number of data bits (i.e., have a data width) according to design-specific requirements. First divided clock signal 312 may also be provided to a second divider 324, as described below.

Second communication channel 356 may include functionality to enable the transfer of a data stream through second communication channel 356. Second communication channel 356 may receive a second master clock signal 340. Second master clock signal 340 may be generated by a phase lock loop (PLL) (not shown) or any other type of clock generator. The PLL may be the same PLL discussed above with respect to first communication channel 302 or may be a different clock generator as described above. Second communication channel 356 may include a second phase interpolator 342 configured to generate and output a second phase adjusted clock signal 344 based upon second master clock signal 340. Second communication channel 356 may include a third divider 346 that may receive second phase adjusted clock signal 344 as an input and generate a third divided clock signal 348 based upon second phase adjusted clock signal 344. Third divided clock signal 348 may be generated by dividing second master clock signal 340 by the number of data bits in the interface of second communication channel 356 (i.e., the number of data bits to be transferred through second communication channel 356). Third divided clock signal 348 may be used as the clock for transferring data through second communication channel 356 as described below.

Second communication channel 356 may also include a number of second data driving circuits 320*b*. In some embodiments, second data driving circuits 320*b* may be composed of flip-flops (e.g., D flip-flops), latches, registers and/or the like, which act as data drivers. The number of data drivers in second data driving circuits 320*b* may be greater than or equal to the number of data bits in the data interface of second communication channel 356. Each of the data drivers of second data driving circuits 320*b* may receive third divided clock signal 348 as a clock input and a second data line 358 as a data input. In some embodiments, data transferred on second communication channel 356 may optionally be provided from a second optional data line 352 and through a second delay 354 before being provided to second data line 358. In such embodiments, second delay 354 may be any delay element (e.g., a buffer, an inverter or inverter pair, and/or the like) configured to delay data on second optional data line 352 such that a difference between data transmission timing due to architectural differences between communication channels 302 and 356 is reduced or eliminated. It is contemplated that in some embodiments, the delay provided by first delay 316 and/or second delay 354 may be programmable and/or adjustable. Data on second communication channel 356 may then be driven (i.e., transferred) through second communication channel 356 on a second transmit data line 322*b* by second data driving circuits 320*b*. It is noted that second data line 358, second optional data line 314, and second transmit data line 322*b* may be any number of data bits (i.e., have a data width) according to design-specific requirements. Third divided clock signal 348 may also be provided to a fourth divider 350, as described below.

Communication system 300 may also include second divider 324 and fourth divider 350, in some example embodiments. Second divider 324 and fourth divider 350 may respectively receive and divide first divided clock signal 312 and third divided clock signal 348 to generate a second divided clock signal 326 and a fourth divided clock signal 360, respectively. Second divider 324 and fourth divider 350 may be configured to enable generation of two clock signals with the same frequency (e.g., second divided clock signal 326 and fourth divided clock signal 360). For example, first divided clock signal 312 and third divided clock signal 348 may have different frequencies based upon first master clock signal 304 and second master clock signal 340 respectively. Second divider 324 and fourth divider 350 may respectively divide first divided clock signal 312 and third divided clock signal 348 by different factors such that second divided clock signal 326 and fourth divided clock signal 360 have the same frequency or about the same frequency. As an illustrative example, if first divided clock signal 312 is 300 MHz and third divided clock signal 348 is 200 MHz, second divider 324 may divide first divided clock signal 312 by a factor of three ('3'), and fourth divider 350 may divide third divided clock signal 348 by a factor of two ('2') resulting in both second divided clock signal 326 and fourth divided clock signal 360 having the same frequency of 100 MHz. Second divided clock signal 326 and fourth divided clock signal 360 may be provided to a phase detector 328, as shown in FIG. 3 and described below.

Communication system 300 may include phase detector 328, in some example embodiments. Phase detector 328 may include functionality for enabling the detection of a leading or lagging phase between two divided clock signals (e.g., second and fourth divided clock signals 326 and 360). In some embodiments, phase detector 328 may be a flip-flop (e.g., a D flip-flop), while in other embodiments phase detector 328 may be a latch, a register, or the like. Phase detector 328 may receive second divided clock signal 326 as a clock input and may receive and fourth divided clock signal 360 as a data input. In some embodiments, for example, when phase detector 328 is a D flip-flop, second divided clock signal 326 may be input as the clock for phase detector 328, and fourth divided clock signal 360 may be input as the data for phase detector 328. Phase detector 328 may output a phase difference signal 330 based on second divided clock signal 326 and fourth divided clock signal 360. For example, in the case where the phase of fourth divided clock signal 360 leads the phase of second divided clock signal 326, phase difference signal 330 may be represented as a '1' (one) or a logic "high" signal. In the case where the phase of fourth divided clock signal 360 lags the phase of second divided clock signal 326, phase difference signal 330 may be represented as a '0' (zero) or a logic "low" signal. It is contemplated that in various embodiments, according to design considerations, phase difference signal 330 maybe a '1' for a lagging phase and a '0' for a leading phase. Phase detector 328 may provide phase difference signal 330 to a digital circuit 334.

Phase detector 328 may, in some embodiments, be enabled and/or disabled by a disable signal 332. Phase detector 328 may be enabled/disabled by disable signal 238 in response to completing a phase adjustment between first phase adjusted clock signal 308 and second phase adjusted clock signal 344. Disable signal 332 may be generated by hardware, or a combination of hardware and software and/or firmware within or without communication system 300. Disable signal 332 and any associated circuitry may include functionality further than shown in FIG. 3, as would be known to persons skilled in relevant art(s). However, such additional functionality is not shown in FIG. 3 for purposes of brevity. By disabling phase detector 328 upon completion of the phase adjustment(s) (i.e., when phase detector 328 is not actively in use), power savings and noise reduction may be achieved. Phase detector 328 may be enabled by disable signal 332 at the startup of communication system 300, startup of one or more of communication channels 302 and 356, or when coming out of a reset state of communication system 300 or one or more of communication channels 302 and 356.

It is contemplated that, in some embodiments, phase detector 328 may reside, physically or logically, in one of communication channels 302 and 356. In other embodiments, phase detector 328 may reside outside of communication channels 302 and 356 but inside communication system 300. In still further embodiments, phase detector 328 may reside outside of communication system 300.

In some embodiments, communication system 300 may also include digital circuit 344, as shown in FIG. 3. Digital circuit 344 may include functionality for enabling detection of a phase difference between two signals that is outside of an acceptable tolerance (similarly to digital circuit 122 of FIG. 1). For example, an amount of phase difference between second divided clock signal 312 and fourth divided clock signal 348 may be detected. In some embodiments, digital circuit 344 may be a digital filter. Digital circuit 344 may receive phase difference signal 330 as an input, and may output phase adjustment signal 336 to second phase interpolator 342. It is contemplated that in some embodiments, phase adjustment signal 336 may be provided to first phase interpolator 306 instead of second phase interpolator 342. In such embodiments, second divided clock signal 326 may be provided to phase detector 328 as a data input, while fourth divided clock signal 360 may be provided to phase detector 328 as a clock input. Digital circuit 334 may, in some embodiments, be enabled and/or disabled by a digital disable signal 338. Digital circuit 334 may be enabled/disabled by digital disable signal 338 in response to completing a phase adjustment between phase adjusted clock signals 208a-b. Digital disable signal 338 may be the same signal as disable signal 332 or may be generated separately, but similarly, to disable signal 332, as described above.

It is also contemplated that the phase adjustment described with respect to communication system 200 of FIG. 2 may be performed at a transmitter side or a receiver side of communication system 200, as would be apparent to persons skilled in relevant art(s) having the benefit of this disclosure. It is further contemplated that communication system 300 may include more than two communication channels, as described with respect to communication systems 100 and 200.

As such, in an embodiment, communication channels having different architectures (e.g., different master clock frequencies) may be phase aligned. The low speed clocks of the channels may be selected, and a clock frequency that is a lowest common denominator thereof may be determined and generated for each channel from the channel's lowest speed clock. A phase error between the common clock frequencies of the channels may be determined, and a phase interpolator of one of the channels may be adjusted accordingly. This creates a fixed/predictable skew between the channels having different architectures, which can be compensated by a first-in first-out buffer or by another mechanism(s). The predictable skew is due to the difference in multiplexor up latency. Furthermore, there is no need to reset any of the additional dividers.

Example Operational Embodiments

Figure 4:
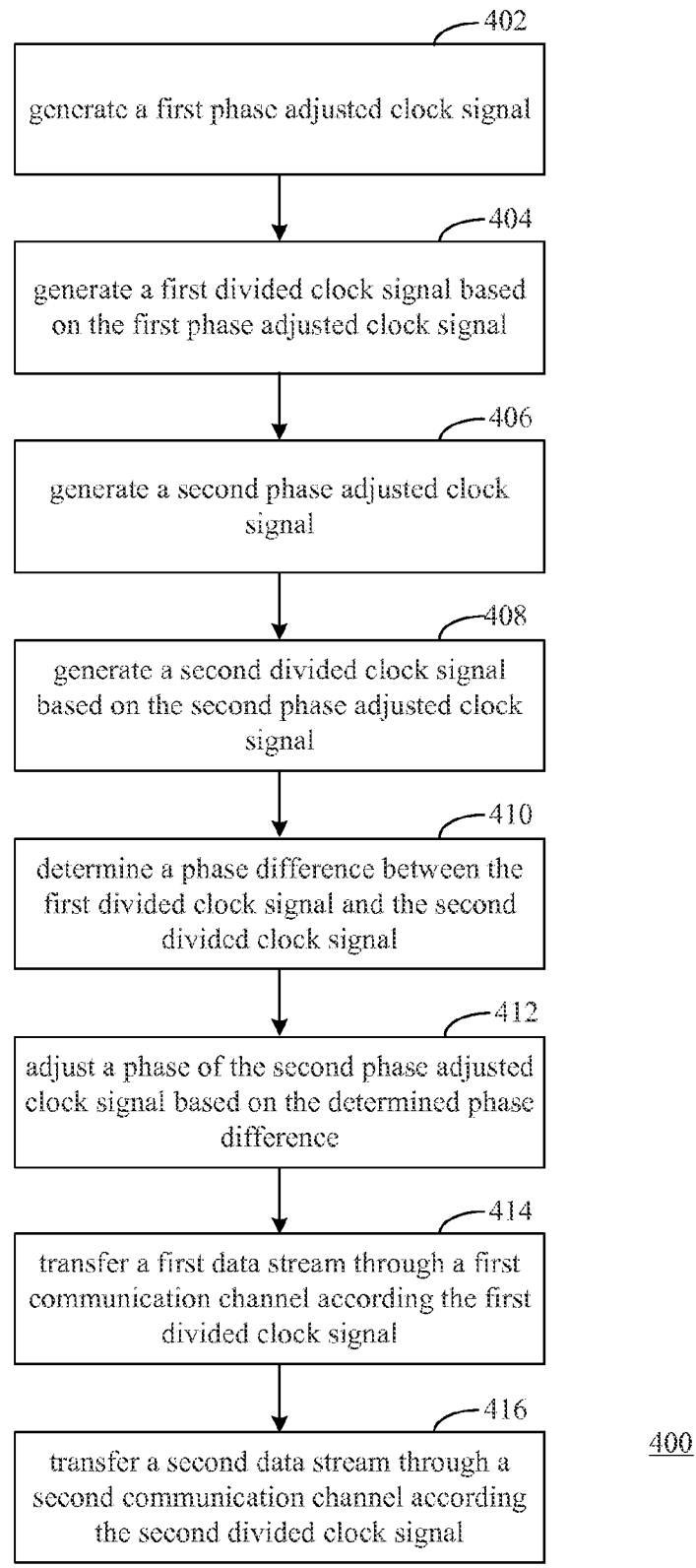
FIG. 4 shows a flowchart providing example steps for providing clock and data alignment, according to an exemplary embodiment.

The above described communication systems may perform their functions in various ways, including as described above and as described in the present subsection. For example, FIG. 4 shows a flowchart 400 providing example steps for aligning clock phases and data in a multi-channel communication system, according to an exemplary embodiment. Systems 100 of FIG. 1 and 200 of FIG. 2 may each operate according to flowchart 400, in an embodiment. Other structural and operational embodiments will be apparent to persons skilled in the relevant art(s) based on the discussion regarding flowchart 400. Flowchart 400 is described as follows.

Flowchart 400 may begin with step 402. In step 402, a first phase adjusted clock signal may be generated. For example, referring again to FIG. 1, first phase interpolator 106a of first communication channel 102a may receive master clock signal 104. First phase interpolator 106a may adjust the phase of master clock signal 104 and output first phase adjusted clock signal 134. First phase interpolator 106a may initially output first phase adjusted clock signal 134 without a phase adjustment if no phase adjustment is initially required or determined That is, first phase adjusted clock signal 134 may initially be generated with zero phase adjustment. In some embodiments, first phase interpolator 106a may maintain first phase adjusted clock signal 134 without a phase adjustment.

In step 404, a first divided clock signal may be generated based on a master clock signal. For example, as described above with respect to FIG. 1, first divider 110a of first communication channel 102a may receive and divide phase adjusted clock signal 134 to generate first divided clock signal 114 based on phase adjusted clock signal 134. First divided clock signal 114 may be generated by dividing phase adjusted clock signal 134 by an amount so that divided clock signal 114 matches a data rate of data to pass through first communication channel 102a. As such, first divided clock signal 114 may be used as the clock for transferring data through first communication channel 102a. For example, if first communication channel 102a transmits 16 bits of data at a time, phase adjusted clock signal 134 may be divided such that the serialized data is transmitted through communication channel 102a sixteen times as fast as the frequency of master clock signal 104. As such, the overall data transmission rate may be maintained.

In step 406, a second phase adjusted clock signal may be generated. For example, referring again to FIG. 1, second phase interpolator 106b of second communication channel 102b may receive master clock signal 104. Second phase interpolator 106b may adjust the phase of master clock signal 104 and output second phase adjusted clock signal 108. Second phase interpolator 106b may initially output second phase adjusted clock signal 108 without a phase adjustment if no phase adjustment is initially required or determined That is, second phase adjusted clock signal 108 may initially be generated with zero phase adjustment. Further phase adjustment of second phase adjusted clock signal 108 is described below with respect to step 412.

In step 408, a second divided clock signal may be generated based on the second phase adjusted clock signal. For example, as shown in FIG. 1, second divider 110b receives second phase adjusted clock signal 108, then generates and outputs second divided clock signal 112 based upon second phase adjusted clock signal 108. As similarly discussed above in step 404 with respect to first divided clock signal 114, second divider 110b may divide second phase adjusted clock signal 108 by a factor equal to the number of data bits of the data interface of second communication channel 102b. Second divided clock signal 112 may be used as the clock for transferring data through second communication channel 102b. FIG. 2 similarly shows an alternate configuration for generating a second divided clock signal. For example, second divided clock signal 212b may be generated by second divider 210b, as shown in FIG. 2.

In step 410, a phase difference may be determined between the first divided clock signal and the second divided clock signal. For example, as shown in FIG. 1, first divided clock signal 114 of first communication channel 102a and second divided clock signal 112 of second communication channel 102b may be received as inputs to first phase detector 116. In one embodiment, first divided clock signal 114 may be a clock input to first phase detector 116, and second divided clock signal 112 may be a data input to first phase detector 116. First phase detector 116 may output phase difference signal 120 based on first divided clock signal 114 and second divided clock signal 112. For example, in the case where the phase of second divided clock signal 112 leads the phase of first divided clock signal 114, phase difference signal 120 may be represented as a '1' (one) or a logic "high" signal. In the case where the phase of second divided clock signal 112 lags the phase of first divided clock signal 114, phase difference signal 120 may be represented as a '0' (zero) or a logic "low" signal. FIG. 2 similarly shows an alternate configuration for determining a phase difference between the first divided clock signal and the second divided clock signal. For example, phase detector 240 may receive first divided clock signal 212a and second divided clock signal 212*b* via first MUX output 232 and may output phase difference signal 242, as shown in FIG. 2.

In step 412, a phase of the second phase adjusted clock signal may be adjusted based on the determined phase difference. For example, as shown in FIG. 1, phase difference signal 120 may be transmitted to digital circuit 122 which may provide phase adjustment signal 124, based on phase difference signal 120, to second phase interpolator 106*b*. Second phase interpolator 106*b* may adjust the phase of second phase adjusted clock signal 108 based, at least in part, on phase adjustment signal 124. The phase of second phase adjusted clock signal 108 may be adjusted by moving first phase adjusted clock signal 108 signal forward or backward with respect to a reference time or a signal reference point associated with master clock signal 104. For example, the phase of second phase adjusted clock signal 108 may be adjusted by delaying second phase adjusted clock signal 108 by a predetermined period of time or number of degrees. The predetermined period of time and/or number of degrees may be based, in some embodiments, upon design considerations such as the frequency of an associated master clock (e.g., master clock signal 104). For example, the predetermined period of time may be 1 microsecond or a multiple thereof, 1 nanosecond or a multiple thereof, 1 picosecond or a multiple thereof, or any other period of time appropriate for a given frequency of an associated master clock signal.

As such, the clock signals (first and second divided clock signals 114 and 112) of first and second communication channels 102*a* and 102*b* may be adjusted to be in phase, as well as the clock signals of any additional communication channels that are present (e.g., communication channels 102*c*-102*n*). This adjustment enables synchronous operation, removing skew of data from lane to lane. This adjustment may be performed at any time, including at power up and/or at system reset. Subsequent to performing the adjustment, the communication channels may be used to transfer data streams in a synchronous manner. For instance, after such adjustment is performed, steps 414 and 416 of flowchart 400 may be performed, as described as follows.

In step 414, a first data stream may be transferred through a first communication channel according to the first divided clock signal. For example, as shown in FIG. 2, a first data stream on first data line 216*a* may be clocked through a number of first data driving circuits 214*a* based on first divided clock signal 212*a*. The first data stream may be transferred through first communication channel 202*a* on first transfer data line 218*a*. As described above with respect to FIG. 2, first data driving circuits 214*a* may be composed of flip-flops (e.g., D flip-flops), latches, registers and/or the like, which act as data drivers. It should be noted that for embodiments in which the first communication channel is asynchronous with respect to one or more other channels, the first data stream may be transferred without waiting for phase adjustment of the one or more other channels. For embodiments in which the first communication channel is synchronous with respect to one or more other channels, the first data stream may be transferred after phase adjustments of the one or more other channels.

In step 416, a second data stream may be transferred through a second communication channel according the second divided clock signal. For example, referring back to FIG. 2, a second data stream on second data line 216*b* may be clocked through a number of second data driving circuits 214*b* based on second divided clock signal 212*b*. The second data stream may be transferred through second communication channel 202*b* on second transfer data line 218*b*. As described above with respect to FIG. 2, second data driving circuits 214*b* may be composed of flip-flops (e.g., D flip-flops), latches, registers and/or the like, which act as data drivers, and may analogously configured to first data driving circuits 214*a*. Furthermore, the first and second data streams on first and second data lines 218*a* and 218*b* are transferred synchronously, due the operation of steps 402-412 to align the respective channel clocks. It is contemplated, however, that in some embodiments, one or more communication channels (e.g., some combination of data channels 202*a-n*) may operate synchronously and/or asynchronously with respect to other data channels, as described herein.

Figure 5:
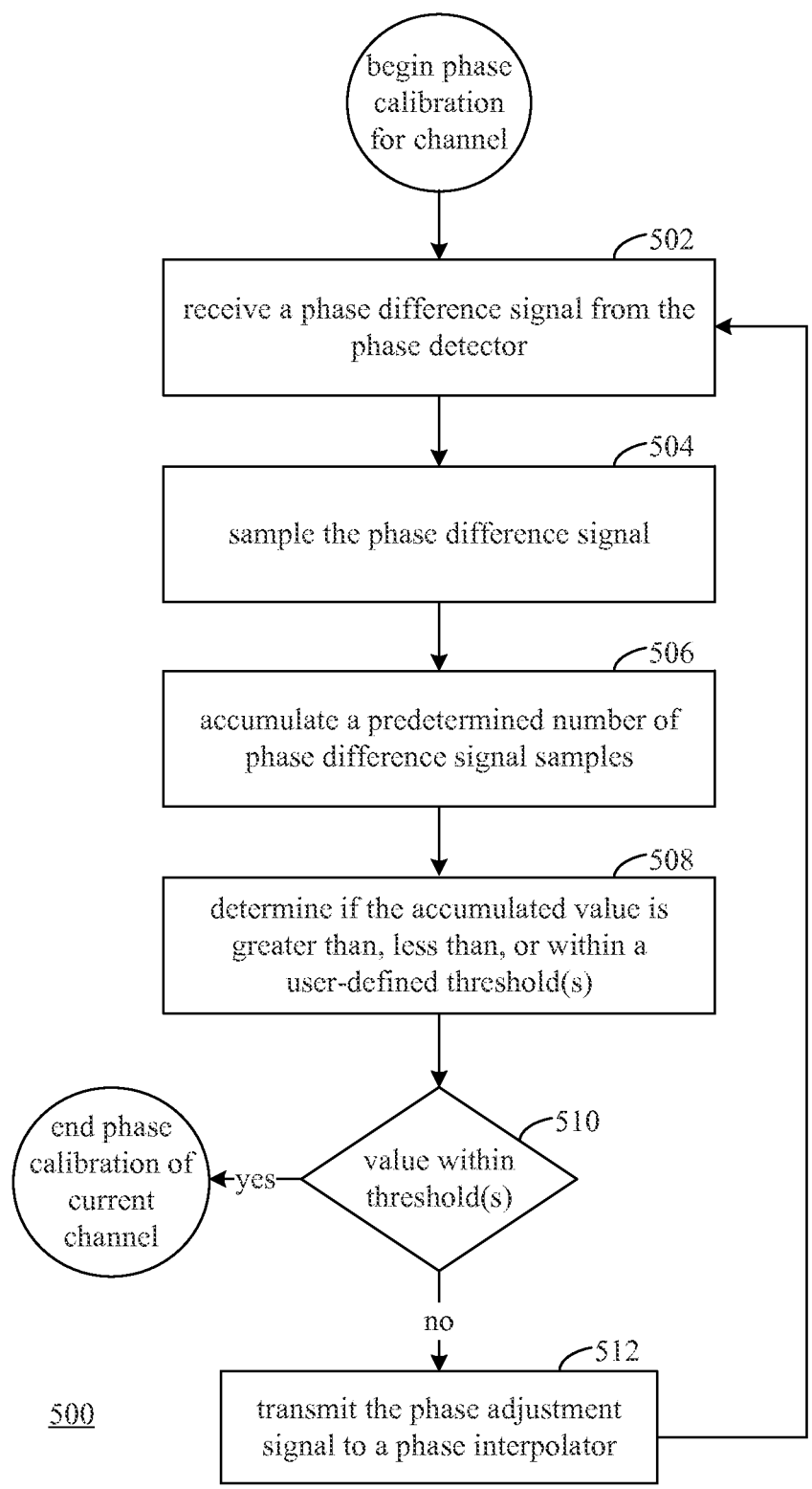
FIG. 5 shows a flowchart providing example steps for determining clock and data alignment, according to an exemplary embodiment.

In another example, FIG. 5 shows a flowchart 500 providing example steps for determining and transmitting a phase adjustment signal to a phase interpolator for a communication channel, according to an embodiment. It is contemplated that the steps of flowchart 500 may be repeated for some or all communication channels in a given communication system (e.g., 100, 200, and 300). Digital circuits 122, 244, and 334 (of FIGS. 1-3, respectively) may each operate according to flowchart 500, in an embodiment. In some embodiments, flowchart 500 may further describe details associated with steps 410 and 412 of flowchart 400, as described above with respect to FIG. 4. In some embodiments, flowchart 500 may further describe details associated with steps 614 and 616 of flowchart 600, as described below with respect to FIG. 6. Other structural and operational embodiments will be apparent to persons skilled in the relevant art(s) based on the discussion regarding flowchart 500. Flowchart 500 is described as follows.

Flowchart 500 may begin with step 502. In step 502, a phase difference signal may be received from the phase detector. For example, as shown in FIG. 1, phase difference signal 120 may be transmitted to digital circuit 122 of communication system 100. First phase detector 116 may output phase difference signal 120 based on first divided clock signal 114 and second divided clock signal 112, as shown in FIG. 1. In the case where the phase of second divided clock signal 112 leads the phase of first divided clock signal 114, phase difference signal 120 may be represented as a '1' (one) or a logic "high" signal. In the case where the phase of second divided clock signal 112 lags the phase of first divided clock signal 114, phase difference signal 120 may be represented as a '0' (zero) or a logic "low" signal.

In step 504, the phase difference signal may be sampled. For example, as shown in FIG. 1 and as described above, a logic "high" signal or a logic "low" signal may be received by digital circuit 122 via phase difference signal 120. Digital circuit 122 may sample the received phase difference signal 120. Sampling of phase difference signal 120 may be performed at a predetermined frequency (e.g., a sub-sampled output).

In step 506, a predetermined number of phase difference signal samples may be accumulated. For example, digital circuit 122, as shown in FIG. 1, may accumulate or store a predetermined number of samples of phase difference signal 120. Samples may be accumulated by one or more registers, flip-flops, memories, counters, and/or the like. The number of samples accumulated may be based in part on design-specific considerations such as master clock frequency, availability of accumulation storage, and/or the like. For example, eight samples, sixteen samples, thirty-two samples, sixty-four samples, and even greater numbers of samples may be accumulated (e.g., summed). In some embodiments, the accumulated samples may be based on a logic "high" signal (e.g., '1' (one)) or a logic "low" signal (e.g., '0' (zero)) phase difference signal (e.g., phase difference signal 120) received from a phase detector (e.g., first phase detector 116).

In step 508, the sampled count (i.e., the accumulation) may be compared to one or more user-defined thresholds (e.g., to determine whether the sampled count is greater than, greater than or equal to, less than, less than or equal to, within a range, etc., relative to the threshold(s)). For example, digital circuit 122, as shown in FIG. 1, may store a user-defined or pre-defined threshold(s) that corresponds to an acceptable phase difference tolerances for leading or lagging phases. The user-defined threshold(s) may be compared to the accumulated sample count. The result of the comparison may be indicative of a leading or a lagging phase of a divided clock signal (e.g., second divided clock signal 112 as shown in FIG. 1). For instance, with regard to an example of 16 samples being accumulated, a user-defined, lagging threshold may be set to a value of '0', '1', '2', '3', etc., and a user-defined, leading threshold may be set to a value of '16', '15', '14', '13', etc. In some embodiments, more than one user-defined threshold (e.g., for leading and lagging phases) may be stored and compared with the accumulated sample count. It is also contemplated that any value for the user-defined threshold(s) may be used in accordance with design goals.

In the example embodiment shown in FIG. 1, an accumulated count of 1's and 0's for a sample size of sixteen ('16') that is greater than (or greater than or equal to) a corresponding first (e.g., upper) threshold may indicate that the phase of second divided clock signal 112 is lagging first divided clock signal 114 by an unacceptable or undesirable margin. Similarly, an accumulated count of 1's and 0's for the sample size of sixteen that is less than (or less than or equal to) a corresponding second (e.g., lower) threshold may indicate that the phase of second divided clock signal 112 is leading first divided clock signal 114 by an unacceptable or undesirable margin. An accumulated count of 1's and 0's for the sample size of sixteen that falls between the threshold values may indicate that the phases of first and second divided clock signals 114 and 112 are sufficiently close to each other.

In step 510, if it is determined that the accumulated count is between the leading and lagging thresholds, digital circuit 122 may indicate that no phase adjustment is currently needed for a phase adjusted clock (e.g., 108), and the calibration of the current communication channel (e.g., 102*a-n*) may end. In some embodiments, digital circuit 122 may indicate no adjustment is needed by transmitting a corresponding voltage or value on transmit phase adjustment signal (e.g., 124) to a phase interpolator (e.g., 106*b*). If it is determined that the accumulated count is not between the leading and lagging thresholds the flow proceeds to step 512 where digital circuit 122 may indicate that a phase adjustment is currently needed for the phase adjusted clock.

In step 512, the phase adjustment signal may be transmitted to the phase interpolator. Digital circuit 122, as shown in FIG. 1, may transmit phase adjustment signal 124 to second phase interpolator 106*b*. If it is determined that the accumulated count is not between the leading and lagging thresholds, digital circuit 122 may indicate that a phase adjustment is currently needed for phase adjusted clock 108. Phase adjustment signal 124 may be set to a voltage or value indicating an adjustment be made to align phase adjusted clock 108 for a lagging phase as determined, or may be set to a voltage or value indicating an adjustment be made to align phase adjusted clock 108 for a leading phase as determined. For example, phase interpolator 106*b* may rotate the received master clock signal (e.g., 104) forward for a lagging phase or backward for a leading phase.

Figure 6:
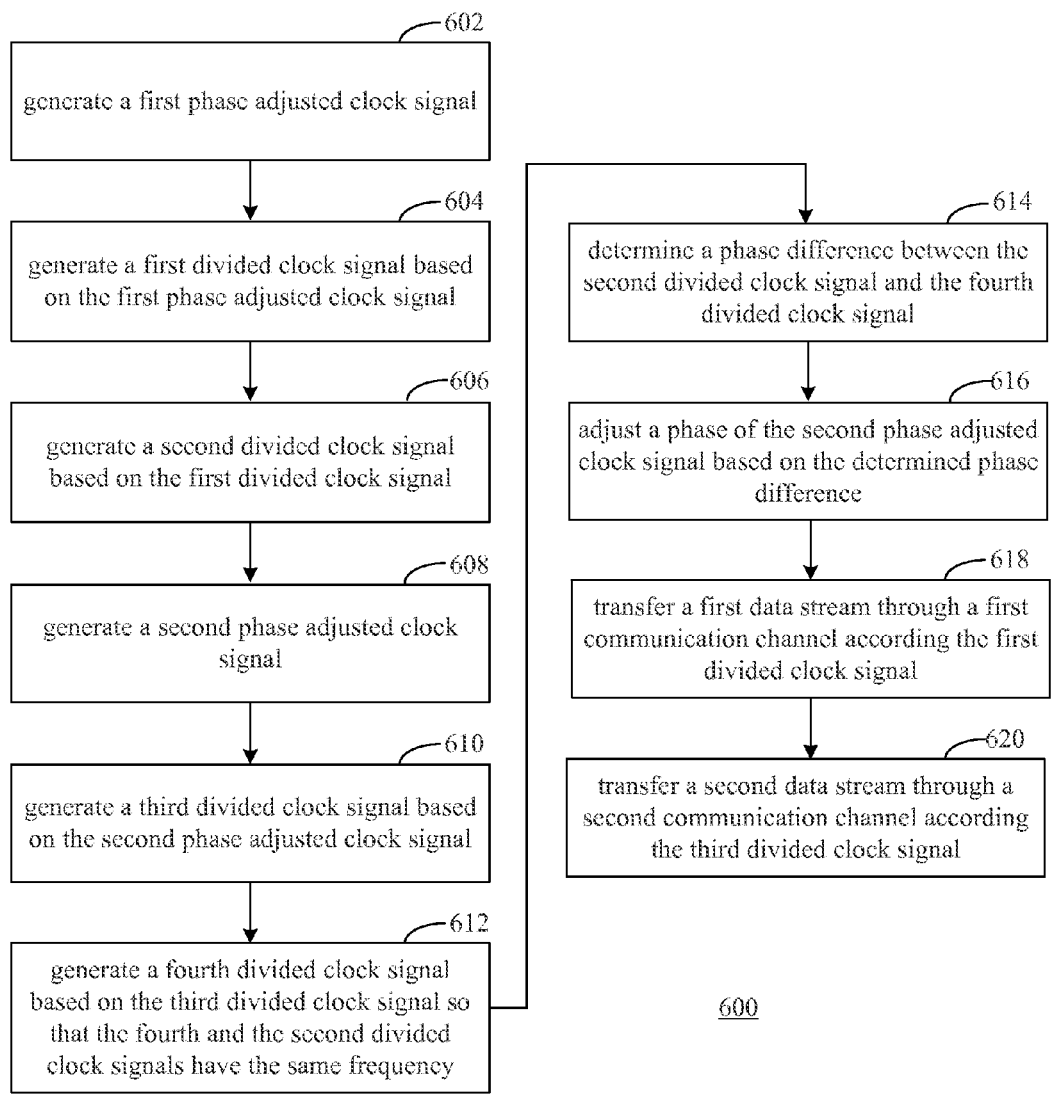
FIG. 6 shows a flowchart providing example steps for providing clock and data alignment, according to an exemplary embodiment.

Furthermore, in embodiments, system 300 may be configured in any manner to perform its functions. For example, FIG. 6 shows a flowchart 600 providing example steps for aligning clock phases and data in a multi-channel communication system, according to an exemplary embodiment. System 300 of FIG. 3 may operate according to flowchart 600, in an embodiment. Other structural and operational embodiments will be apparent to persons skilled in the relevant art(s) based on the discussion regarding flowchart 600. Flowchart 600 is described as follows.

Flowchart 600 may begin with step 602. In step 602, a first phase adjusted clock signal may be generated. For example, as shown in FIG. 3, first phase interpolator 306 of first communication channel 302 may receive first master clock signal 304. First phase interpolator 306 may adjust the phase of first master clock signal 304 and output first phase adjusted clock signal 308. First phase interpolator 306 may initially output first phase adjusted clock signal 308 without a phase adjustment if no phase adjustment is initially required or determined That is, first phase adjusted clock signal 308 may initially be generated with zero phase adjustment. Further phase adjustment of first phase adjusted clock signal 308 is described below with respect to step 616.

In step 604, a first divided clock signal may be generated based on a master clock signal. For example, as described above with respect to FIG. 3, first divider 310 of first communication channel 302 may receive first phase adjusted clock signal 308 and generate first divided clock signal 312 based on first phase adjusted clock signal 308. First divided clock signal 312 may be generated by dividing first phase adjusted clock signal 308 by the number of data bits in the interface of first communication channel 302. First divided clock signal 312 may be used as the clock for transferring data through first communication channel 302.

In step 606, a second divided clock signal may be generated based on the first divided clock signal. For example, as described above with respect to FIG. 3, second divider 324 of first communication channel 302 may receive and divide first divided clock signal 312 to generate second divided clock signal 326. Second divided clock signal 326 may be generated by dividing first divided clock signal 312 by a predetermined factor such that second divided clock signal 326 may have the same frequency as fourth divided clock signal 360, as described with respect to FIG. 3. That is, second divider 324 may be configured to enable second divided clock signal 326 to have the same frequency as fourth divided clock signal 360 generated by fourth divider 350. For example, first divided clock signal 312 and third divided clock signal 348 may have different frequencies based upon first master clock signal 304 and second master clock signal 340 respectively. Second divider 324 and fourth divider 350 may respectively divide first divided clock signal 312 and third divided clock signal 348 by different factors such that second divided clock signal 326 and fourth divided clock signal 360 have the same frequency or about the same frequency.

In step 608, a second phase adjusted clock signal may be generated. For example, as shown in FIG. 3, second phase interpolator 342 of second communication channel 356 may receive second master clock signal 340. Second master clock signal 340 may be generated by one or more PLLs or other clock sources as described herein. Second phase interpolator 342 may adjust the phase of second master clock signal 340 and output second phase adjusted clock signal 344. Second phase interpolator 342 may initially output second phase adjusted clock signal 344 without a phase adjustment if no phase adjustment is initially required or determined That is, second phase adjusted clock signal 344 may initially be generated with zero phase adjustment. Further phase adjustment of second phase adjusted clock signal 344 is described below with respect to step 620.

In step 610, a third divided clock signal may be generated based on the second phase adjusted clock signal. For example, as shown in FIG. 3, third divider 346 of second communication channel 356 may receive and divide second phase adjusted clock signal 344 to generate third divided clock signal 348. Third divided clock signal 348 may be generated by dividing second phase adjusted clock signal 344 by the number of data bits in the interface of second communication channel 356. Third divided clock signal 348 may be used as the clock for transferring data through second communication channel 356.

In step 612, a fourth divided clock signal may be generated based on the third divided clock signal. For example, as described above with respect to FIG. 3, fourth divider 350 of second communication channel 356 may receive third divided clock signal 348 and generate fourth divided clock signal 360 based on third divided clock signal 348. Fourth divided clock signal 360 may be generated by dividing third divided clock signal 348 by a predetermined factor such that fourth divided clock signal 360 may have the same frequency as second divided clock signal 326, as described with respect to FIG. 3. That is, fourth divider 350 may be configured to enable fourth divided clock signal 360 to have the same frequency as second divided clock signal 326 generated by second divider 324. For example, third divided clock signal 348 and first divided clock signal 312 may have different frequencies based upon second master clock signal 340 and first master clock signal 304 respectively. Fourth divider 350 and second divider 324 may respectively divide third divided clock signal 348 and first divided clock signal 312a by different factors such that fourth divided clock signal 360 and second divided clock signal 326 have the same frequency or about the same frequency.

In step 614, a phase difference may be determined between the second divided clock signal and the fourth divided clock signal. For example, as shown in FIG. 3, second divided clock signal 326 of first communication channel 302 and fourth divided clock signal 360 of second communication channel 356 may be received as inputs to phase detector 328. In one embodiment, as shown in FIG. 3, second divided clock signal 326 may be a clock input to phase detector 328, and fourth divided clock signal 360 may be a data input to phase detector 328. In some embodiments, phase detector 328 may be a flip-flop (e.g., a D flip-flop). Phase detector 328 may output phase difference signal 330 based on second divided clock signal 326 and fourth divided clock signal 360. For example, in the case where the phase of fourth divided clock signal 360 leads the phase of second divided clock signal 326, phase difference signal 330 may be represented as a '1' (one) or a logic "high" signal. In the case where the phase of fourth divided clock signal 360 lags the phase of second divided clock signal 326, phase difference signal 330 may be represented as a '0' (zero) or a logic "low" signal.

In step 616, a phase of the second phase adjusted clock signal may be adjusted based on the determined phase difference. For example, as shown in FIG. 3, phase difference signal 330 may be transmitted to digital circuit 334 which may provide phase adjustment signal 336, based on phase difference signal 330, to second phase interpolator 342. Second phase interpolator 342 may adjust the phase of second phase adjusted clock signal 344 based, at least in part, on phase adjustment signal 336. The phase of second phase adjusted clock signal 344 may be adjusted by moving second phase adjusted clock signal 344 signal forward or backward with respect to a reference time or a signal reference point associated with second master clock signal 340. For example, the phase of second phase adjusted clock signal 344 may be adjusted by delaying first phase adjusted clock signal 344 by a predetermined period of time. The predetermined period of time may be based, in some embodiments, upon design considerations such as the frequency of an associated master clock (e.g., second master clock signal 340). For example, the predetermined period of time may be 1 microsecond or a multiple thereof, 1 nanosecond or a multiple thereof, 1 picosecond or a multiple thereof, or any other period of time appropriate for a given frequency of an associated master clock signal.

As such, the clock signals of first and second communication channels 302 and 356 may be adjusted to be in phase, as well as the clock signals of any additional communication channels that are present. This adjustment enables synchronous operation, removing skew of data from lane to lane, even where the different communication channels may have different architectures. This adjustment may be performed at any time, including at power up and/or at system reset. Subsequent to performing the adjustment, the communication channels may be used to transfer data streams in a synchronous manner. For instance, after such adjustment is performed, steps 618 and 620 of flowchart 600 may be performed, as described as follows.

In step 618, a first data stream may be transferred through a first communication channel according to the first divided clock signal. For example, as shown in FIG. 3, a first data stream on first data line 318 may be clocked through a number of first data driving circuits 320a based on first divided clock signal 312. The first data stream may be transferred through first communication channel 302 on first transfer data line 322a.

In step 620, a second data stream may be transferred through a second communication channel according to the third divided clock signal. For example, as shown in FIG. 3, a second data stream on second data line 358 may be clocked through a number of second data driving circuits 320b based on third divided clock signal 348. The second data stream may be transferred through second communication channel 356 on second transfer data line 322b.

Further Example Embodiments and Advantages

The embodiments described herein enable alignment of clocks across channels of multi-channel/multilane communication systems having similar or different channel architectures. Such embodiments may be implemented in circuits that have less overhead. After phase alignment/synchronization is performed, the circuits (e.g., phase detector and associated calibration loop) may be turned off to save power. Existing implementations can be modified to enable phase alignment. In embodiments, the resetting and controlling of timing margins, and the resetting of analog dividers is not needed—however, embodiments described herein may be used in conjunction with resetting approaches. Embodiments enable modular design, enable scalability as the number of channels increase, and reduce latency skew to meet tighter transmitter and/or receiver output specifications. Embodiments support communication systems that include multiple standards of communication channels.

In embodiments, methods, systems, and apparatuses are provided for aligning multiple data and clock signals in communication circuits for the same, or different, communication standards. In an example aspect, a communication system may include multiple communications channels implemented to transmit data according to one or more standards. For example, "N" channels may be included, where N is any integer greater than or equal to 2. Each channel may have a corresponding divider to generate a divided clock signal from a master clock signal. The respective divided clock signals may be used as the clock to drive data on the channels. The communication system may also include, for example in one or more channels, a phase interpolator. The phase interpolator may be used to adjust the phase of the divided clock signal of a corresponding channel. The phase may be adjusted to be more aligned with one or more other divided clock signals in the other channels. In this manner the clocks and data of the multiple communication channels may be better aligned. A phase detector may also be included in one or more channels of the communication system. The phase detector may be selectively disabled when not in use, and may determine a phase difference between two divided clock signals of two different channels. The determined phase difference may be used to further adjust the phase of at least one of the clock signals to better align the different communication channels.

In embodiments, the example communication system includes additional communication channels that each include a corresponding phase interpolator configured to receive the master clock signal and generate a corresponding phase adjusted clock signal, and a corresponding divider configured to generate a corresponding divided clock signal from the corresponding phase adjusted clock signal. The corresponding divided clock signal is configured to clock a corresponding data stream through the corresponding communication channel. Each additional communication channel also includes a corresponding phase detector configured to determine a phase difference between the first divided clock signal and the corresponding divided clock signal. The corresponding phase interpolator is configured to adjust a phase of the corresponding phase adjusted clock signal based on the determined phase difference between the first divided clock signal and the corresponding divided clock signal.

In embodiments, the example communication system includes a third communication channel. The third communication channel includes a second phase interpolator configured to receive the master clock signal and generate a second phase adjusted clock signal, and a third divider configured to generate a third divided clock signal from the second phase adjusted clock signal. The third divided clock signal is configured to clock a third data stream through the third communication channel. In embodiments, the example communication system also includes a second phase detector configured to determine a phase difference between the first divided clock signal and the third divided clock signal. The second phase interpolator is configured to adjust a phase of the second phase adjusted clock signal based on the determined phase difference between the second divided clock signal and the third divided clock signal.

In embodiments, the example communication system includes a plurality of communication channels that includes the first and second communication channels. In a first implementation of the plurality of communication channels, at least a first subset of the plurality of communication channels are configured to transmit a first plurality of data streams according to a first communication standard, and in a second implementation of the plurality of communication channels, at least a second subset of the plurality of communication channels are configured to transmit a second plurality of data streams according to a second communication standard, the first communication standard being different from the second communication standard. In embodiments of the example communication system, the first implementation and the second implementation are simultaneously present in the communication system, and the communication system is configured to transmit the first plurality of data streams and the second plurality of data streams in at least one of a synchronous manner or an asynchronous manner with respect to each other.

In embodiments of the example communication system, the phase detector comprises a flip flop configured to receive the first divided clock signal at a clock input and configured to receive the second divided clock signal at a data input.

In embodiments, the example communication system includes a digital circuit portion configured to receive a signal indicative of the determined phase difference from the phase detector and configured to transmit a phase adjustment signal to the phase interpolator based at least in part on the received signal indicative of the determined phase difference. In embodiments, the signal indicative of the determined phase difference comprises at least one of a value associated with a leading phase or a value associated with a lagging phase, and the digital circuit portion is further configured to transmit the phase adjustment signal based at least in part on a predetermined number of samples of the signal indicative of the determined phase difference having the same value of a period of time.

In embodiments of the example communication system, the phase detector is configured to be disabled in response to completing the adjustment of the first phase adjusted clock signal. In embodiments of the example communication system, at least one physical connection made to one or more of the phase detector, the phase interpolator, the first divider, or the second divider is a balanced routing connection configured to reduce signal delay or to reduce a skew mismatch.

In embodiments, the example communication system includes an additional communication channel. The additional communication channel includes an additional phase interpolator configured to receive the master clock signal and generate an additional phase adjusted clock signal, and an additional divider configured to generate an additional divided clock signal from the second phase adjusted clock signal. The additional divided clock signal is configured to clock an additional data stream through the additional communication channel. The example communication system includes a selector configured to select, as a selector input, at least one of the additional divided clock signal or the second divided clock signal. The selector is further configured to output the selector input to the phase detector. The additional phase interpolator is configured to adjust a phase of the additional phase adjusted clock signal based on an additionally determined phase difference between the additional phase adjusted clock signal and the first divided clock signal where the additionally determined phase difference is determined by the phase detector.

In a further example aspect, a communication system may include multiple communications channels implemented to transmit data according to one or more standards. For example, "N" channels may be included, where N is any integer greater than or equal to 2. Each channel may have two or more corresponding dividers. One divider in each channel may generate a divided clock signal from a master clock signal. These respective divided clock signals may be used as the clock to drive data on their channels at their respective clock frequencies. The other divider in each channel may be used to further divide each channel's respective divided clock signal. This second clock division may produce clock signals from each channel that have the same frequency. These clock signals with the same frequency may be provided to a phase detector which may output a signal indicative of their phase relationship (phase alignment). The communication system may also include a phase interpolator which may be used to adjust the phase of one of the divided clock signals driving data in a corresponding channel (e.g., according to the phase detector output signal). The phase may be adjusted to be more aligned with other data-driving, divided clock signals in the other channels. The phase detector may be selectively disabled when not in use. In embodiments, the phase detector may be a flip flop configured to receive a clock signal of the second division at a clock input and configured to receive another clock signal of the second division at a data input.

In embodiments, the example communication system includes a digital circuit portion configured to receive a signal indicative of the determined phase difference from the phase detector and configured to transmit a phase adjustment signal to the phase interpolator of the second channel based at least in part on the received signal indicative of the determined phase difference. In embodiments, the example communication system includes a time-delay element configured to delay at least one data stream of the communication channels.

In embodiments of the example communication system, the phase detector is configured to be disabled in response to completing the phase adjustment.

In embodiments of the example communication system, a first communication channel is configured to transmit at least one data stream according to a first communication standard, and a second communication channel is configured to transmit at least one other data stream according to a second communication standard.

In yet another example aspect, a communication system may include multiple communications channels implemented to transmit data according to one or more standards. For example, "N" channels may be included, where N is any integer greater than or equal to 2. Each channel may have a corresponding divider to generate a divided clock signal from separate master clock signals. The respective divided clock signals may be used as the clock to drive data on the channels. The communication system may also include a phase interpolator that may be used to adjust the phase of the divided clock signal of a corresponding channel. The phase may be adjusted to be more aligned with one or more other divided clock signals in the other channels. A phase detector may also be included in one or more channels of the communication system. The phase detector may be selectively disabled when not in use, and may determine a phase difference between two divided clock signals of two different channels.

In still another example aspect, a method is disclosed. The method includes generating a first phase adjusted clock signal for a first communication channel based on a master clock signal, and generating a first divided clock signal based on the first phase adjusted clock signal. The method also includes generating a second phase adjusted clock signal for a second communication channel based on the master clock signal, and generating a second divided clock signal based on the second phase adjusted clock signal. The method further includes determining a first phase difference between the first divided clock signal and the second divided clock signal, and adjusting a phase of the second phase adjusted clock signal based on the first determined phase difference.

In embodiments, the method also includes transmitting data on the first communication channel based on the first divided clock according to a first communication protocol, and transmitting data on the second communication channel based on the second divided clock according to a second communication protocol.

In embodiments, the method also includes generating a third phase adjusted clock signal for a third communication channel, and generating a third divided clock signal based on the third phase adjusted clock signal. In such embodiments, the method also includes determining a second phase difference between the first divided clock signal and the third divided clock signal, and adjusting a phase of the third phase adjusted clock signal based on the second determined phase difference.

In embodiments, the method also includes generating a third phase adjusted clock signal for a third communication channel, and generating a third divided clock signal based on the third phase adjusted clock signal. The method may also include determining a second phase difference between the second divided clock signal and the third divided clock signal, and adjusting a phase of the third phase adjusted clock signal based on the second determined phase difference.

CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:
1. A communication system, comprising:
   a first communication channel that includes:
      a phase interpolator configured to receive a master clock signal and generate a first phase adjusted clock signal, and
      a first divider configured to generate a first divided clock signal from the first phase adjusted clock signal, the first divided clock signal configured to clock a first data stream through the first communication channel;
   a phase detector configured to determine a phase difference between the first divided clock signal and a second divided clock signal of a second communication channel; and
   a selector configured to receive a plurality of additional divided clock signals from corresponding additional communication channels and select the first divided clock signal from the plurality of additional divided clock signals for input into the phase detector, wherein the selector is further configured to select each of the plurality of additional divided clock signals for input into the phase detector in a serial fashion according to a select signal that controls the selector, wherein the phase interpolator is further configured to adjust a phase of the first phase adjusted clock signal based on the determined phase difference, and wherein the first communication channel further includes at least one data driver circuit configured to receive the first data stream and to clock the first data stream through the first communication channel according to the first divided clock signal.

2. The communication system of claim 1, wherein each additional communication channel includes:

a corresponding phase interpolator configured to receive the master clock signal and generate a corresponding phase adjusted clock signal, and a corresponding divider configured to generate a corresponding divided clock signal from the corresponding phase adjusted clock signal, the corresponding divided clock signal configured to clock a corresponding data stream through the corresponding communication channel;

wherein the phase detector is further configured to determine a phase difference between the second divided clock signal and the corresponding divided clock signal; and wherein the corresponding phase interpolator is configured to adjust a phase of the corresponding phase adjusted clock signal based on the determined phase difference between the second divided clock signal and the corresponding divided clock signal.

3. The communication system of claim 1, further comprising:

a plurality of communication channels that includes the first and second communication channels;

wherein in a first implementation of the plurality of communication channels, at least a first subset of the plurality of communication channels are configured to transmit a first plurality of data streams according to a first communication standard; and wherein in a second implementation of the plurality of communication channels, at least a second subset of the plurality of communication channels are configured to transmit a second plurality of data streams according to a second communication standard, the first communication standard being different from the second communication standard.

4. The communication system of claim 3, wherein the first implementation and the second implementation are simultaneously present in the communication system; and wherein the communication system is configured to transmit the first plurality of data streams and the second plurality of data streams in at least one of a synchronous manner or an asynchronous manner with respect to each other.

5. The communication system of claim 1, further comprising a digital circuit portion configured to receive a signal indicative of the determined phase difference from the phase detector and configured to transmit a phase adjustment signal to the phase interpolator based at least in part on the received signal indicative of the determined phase difference.

6. The communication system of claim 5, wherein the signal indicative of the determined phase difference comprises at least one of a value associated with a leading phase or a value associated with a lagging phase; and wherein the digital circuit portion is further configured to transmit the phase adjustment signal based at least in part on a predetermined number of samples of the signal indicative of the determined phase difference having the same value of a period of time.

7. The communication system of claim 1, wherein:

the phase detector is configured to be disabled in response to completing the adjustment of the first phase adjusted clock signal, or at least one physical connection made to one or more of the phase detector, the first phase interpolator, or the first divider is a balanced routing connection configured to reduce signal delay or to reduce a skew mismatch.

8. The communication system of claim 1, wherein the phase detector is further configured to determine a phase difference between the each of the plurality of additional divided clock signals and the second divided clock signal in the serial fashion according to the select signal that controls the selector.

9. The communication system of claim 8, further comprising:

a second selector configured to:
  receive a phase adjustment signal indicative of the determined phase difference; and
  select the phase interpolator from a plurality of phase interpolators to receive the phase adjustment signal according to a second select signal.

10. A communication system, comprising:

a first communication channel that includes:
  a first phase interpolator configured to receive a first master clock signal and generate a first phase adjusted clock signal,
  a first divider configured to divide the first phase adjusted clock signal by a first factor to generate a first divided clock signal, the first divided clock signal configured to clock a first data stream through the first communication channel, and
  a second divider configured to divide the first divided clock signal to generate a second divided clock signal;

a phase detector configured to determine a phase difference between the second divided clock signal and a third divided clock signal of a second communication channel; and a selector configured to receive a plurality of additional divided clock signals from corresponding additional communication channels and select the second divided clock signal from the plurality of additional divided clock signals for input into the phase detector, wherein the selector is further configured to select each of the plurality of additional divided clock signals for input into the phase detector in a serial fashion according to a select signal that controls the selector;

wherein a phase of the first phase adjusted clock signal is adjusted by the first phase interpolator based on the determined phase difference, and wherein the first communication channel further includes at least one data driver circuit configured to receive the first data stream and to clock the first data stream through the first communication channel according to the first divided clock signal.

11. The communication system of claim 10, further comprising a digital circuit portion configured to receive a signal indicative of the determined phase difference from the phase detector and configured to transmit a phase adjustment signal to the first phase interpolator based at least in part on the received signal indicative of the determined phase difference.

12. The communication system of claim 10, further comprising a time-delay element configured to delay the first data stream.

13. The communication system of claim 10, wherein the phase detector is configured to be disabled in response to completing the adjustment of the first phase adjusted clock signal.

14. The communication system of claim 10, wherein the first communication channel is configured to transmit at least one data stream according to a first communication standard that is different from a second communication standard utilized by the second communication channel.

15. The communication system of claim 10, wherein the phase detector is further configured to determine a phase difference between the each of the plurality of additional divided clock signals and the second divided clock signal in the serial fashion according to the select signal that controls the selector.

16. The communication system of claim 15, further comprising:
 a second selector configured to:
  receive a phase adjustment signal indicative of the determined phase difference between the each of the plurality of additional divided clock signals and the second divided clock signal; and
  select the phase interpolator from a plurality of phase interpolators to receive the phase adjustment signal according to a second select signal.

17. A method in a communication system, comprising:
generating a phase adjusted clock signal for a first communication channel based on a master clock signal;
generating a first divided clock signal based on the phase adjusted clock signal;
determining, using a phase detector, a phase difference between the first divided clock signal and a second divided clock signal of a second communication channel, the determining including:
 receiving a plurality of additional divided clock signals from corresponding additional communication channels, and
 selecting the first divided clock signal from the plurality of additional divided clock signals for input into the phase detector;
adjusting a phase of the phase adjusted clock signal based on the determined phase difference; and
selecting each of the plurality of additional divided clock signals for input into the phase detector in a serial fashion according to a select signal that controls the selector.

18. The method of claim 17, further comprising:
transmitting data on the first communication channel based on the first divided clock signal according to a first communication protocol that is different from a second communication protocol of the second communication channel.

19. The method of claim 17, wherein generating the first divided clock signal comprises:
 generating an initial divided clock signal from the phase adjusted clock signal; and
 generating the first divided clock signal by dividing the initial divided clock signal by a dividing factor.

20. The method of claim 19, wherein the second divided clock signal is generated by:
 generating an initial second divided clock signal from a second phase adjusted clock signal of the second communication channel; and
 generating the second divided clock signal by dividing the initial second divided clock signal by a second dividing factor.

* * * * *